(12) United States Patent
Chen

(10) Patent No.: US 8,413,582 B1
(45) Date of Patent: Apr. 9, 2013

(54) LINEAR ESCAPEMENTS, METHODS FOR MAKING, AND USE

(75) Inventor: Richard T. Chen, Woodland Hills, CA (US)

(73) Assignee: Microfabrica Inc., Van Nuys, CA (US)

(*) Notice: Subject to any disclaimer, the term of this patent is extended or adjusted under 35 U.S.C. 154(b) by 283 days.

(21) Appl. No.: 12/731,098

(22) Filed: Mar. 24, 2010

Related U.S. Application Data

(60) Provisional application No. 61/162,854, filed on Mar. 24, 2009.

(51) Int. Cl.
*F42C 15/20* (2006.01)
*F42C 15/184* (2006.01)

(52) U.S. Cl. ......... 102/232; 102/238; 102/248; 102/255

(58) Field of Classification Search .................. 102/221, 102/222, 231, 232, 233, 235, 237, 238, 244, 102/245, 247, 248, 249, 251, 254, 255
See application file for complete search history.

(56) References Cited

U.S. PATENT DOCUMENTS 3,713,345 A * 1/1973 Sands .............................. 74/1.5
8,037,826 B2 * 10/2011 Taylor ........................... 102/237

* cited by examiner

*Primary Examiner* — James Bergin
(74) *Attorney, Agent, or Firm* — Dennis R. Smalley

(57) ABSTRACT

The present invention relates generally to the field of escapement mechanisms for providing mechanical control of motion based on desired timing criteria and more particularly to micro-scale and millimeter scale escapement mechanisms, and even more particularly to such mechanisms produced in whole or in part using multi-layer, multi-material electrochemical fabrication methods. In some embodiments, such escapement mechanisms are used in safing and arming applications for munitions or other explosive devices where two or more accelerations are present at appropriate times where after an arming delay occurs.

8 Claims, 22 Drawing Sheets

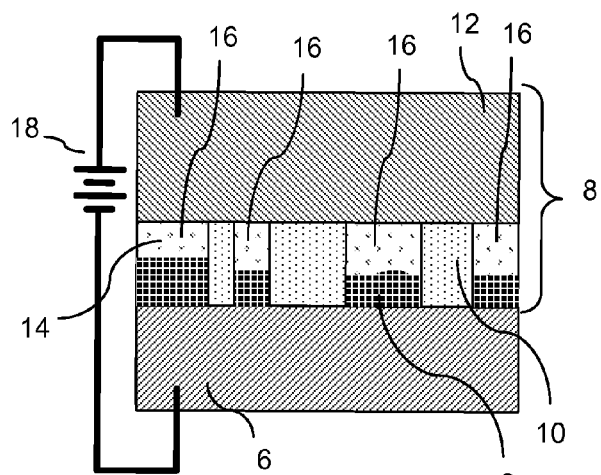
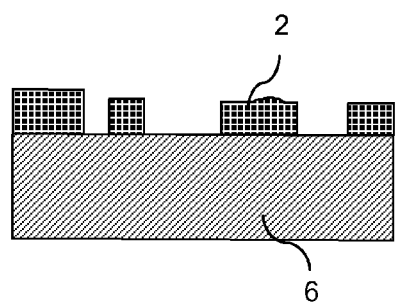
FIG. 2A
(PRIOR ART)
FIG. 2B
(PRIOR ART)
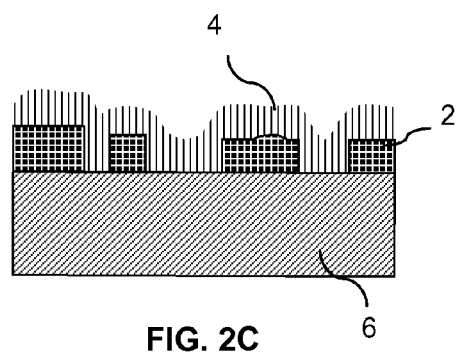
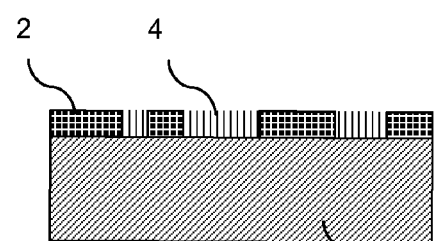
FIG. 2C
(PRIOR ART)
FIG. 2D
(PRIOR ART)
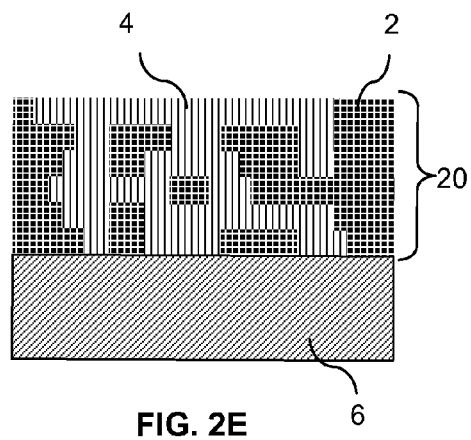
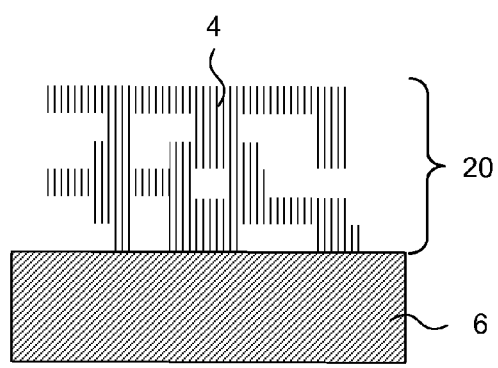
FIG. 2E
(PRIOR ART)
FIG. 2F
(PRIOR ART)

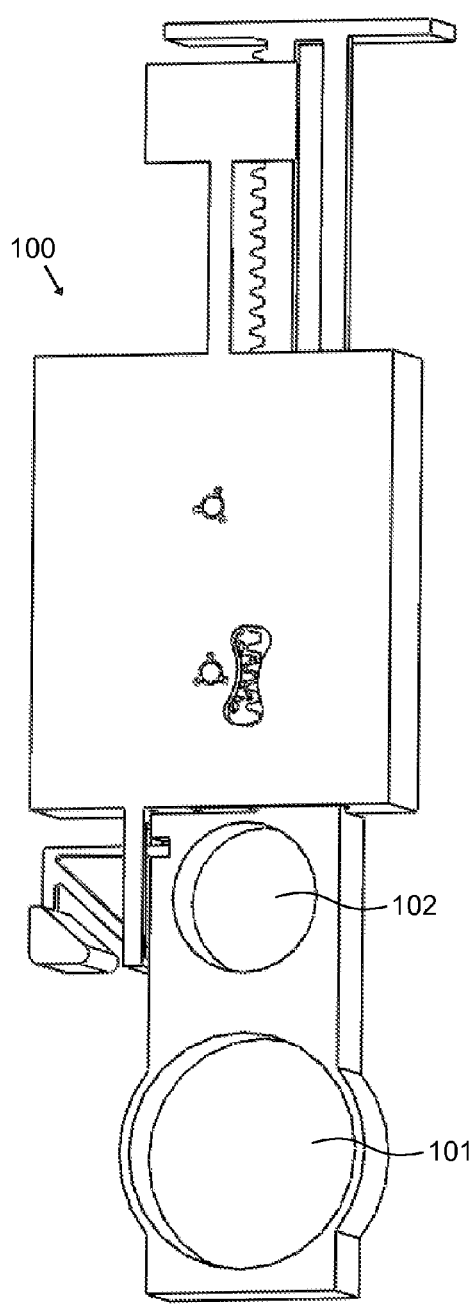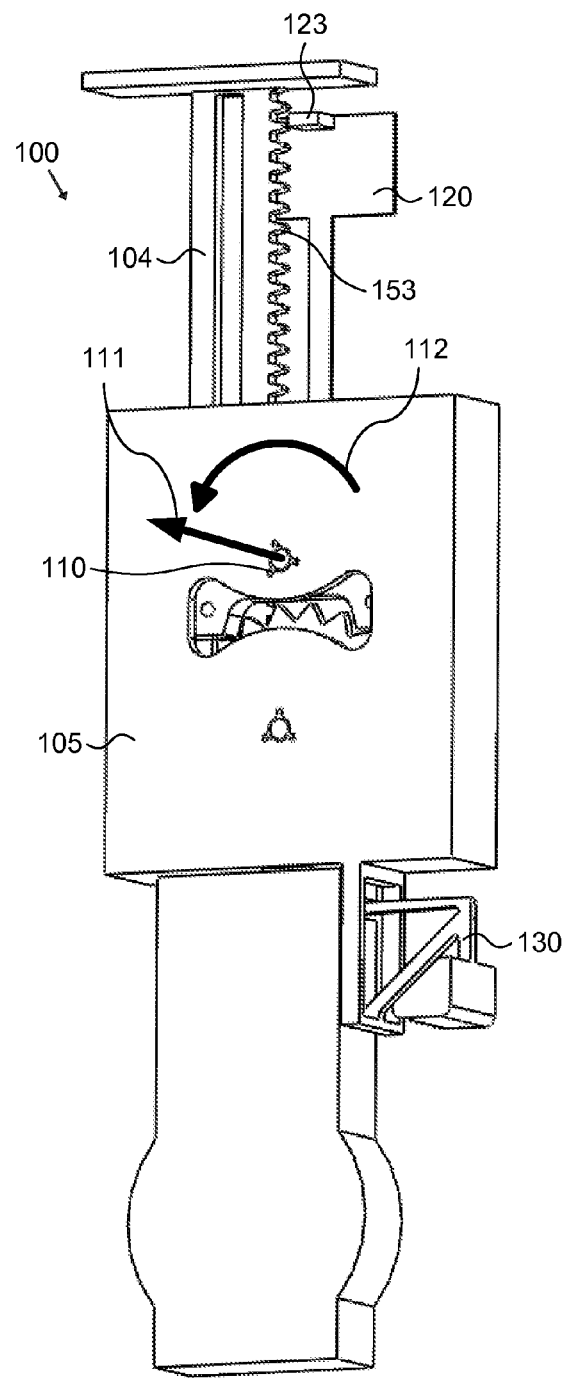
FIG. 5A
FIG. 5B

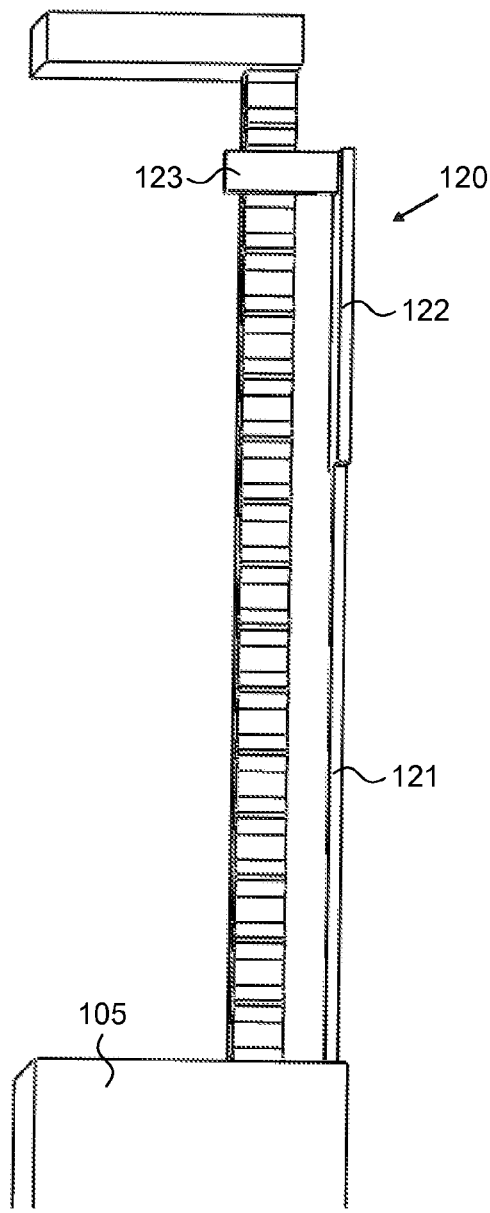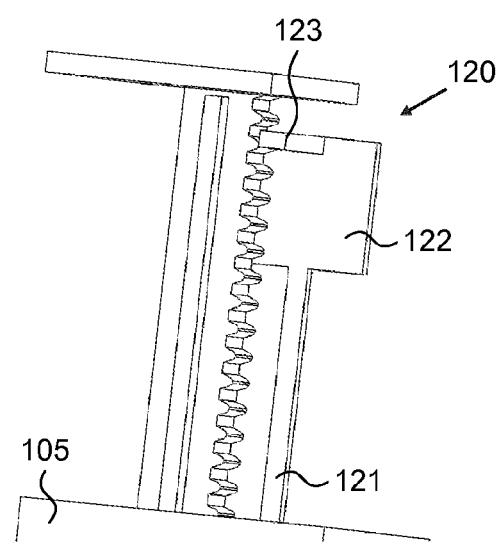
FIG. 9A
FIG. 9B

FIG. 21A
FIG. 21B
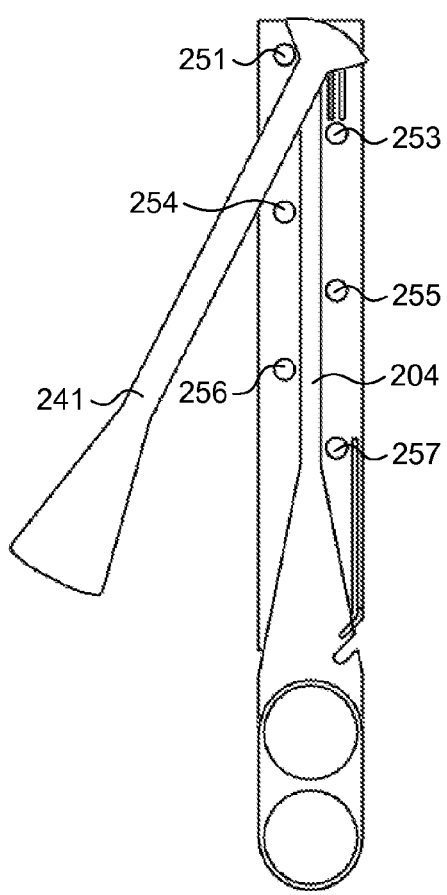
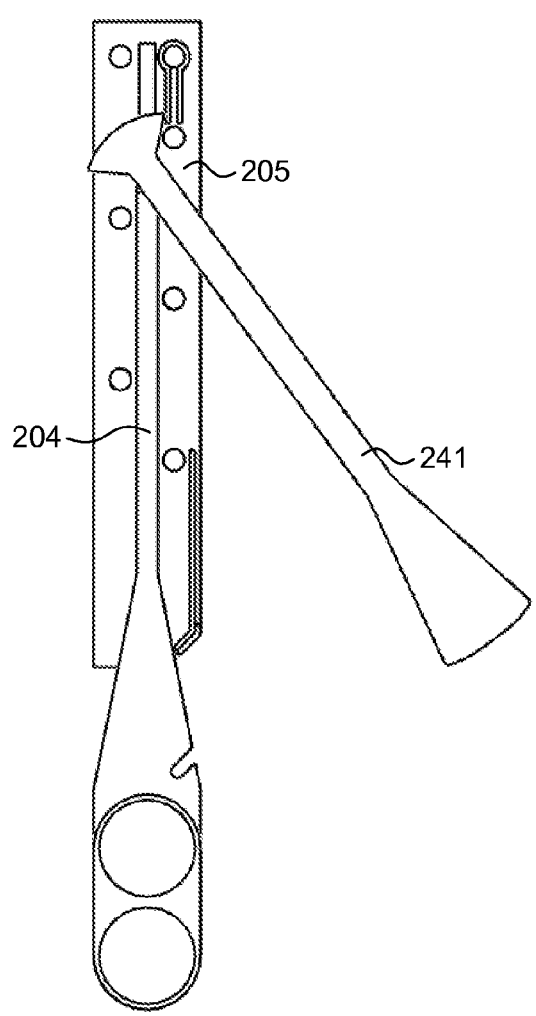

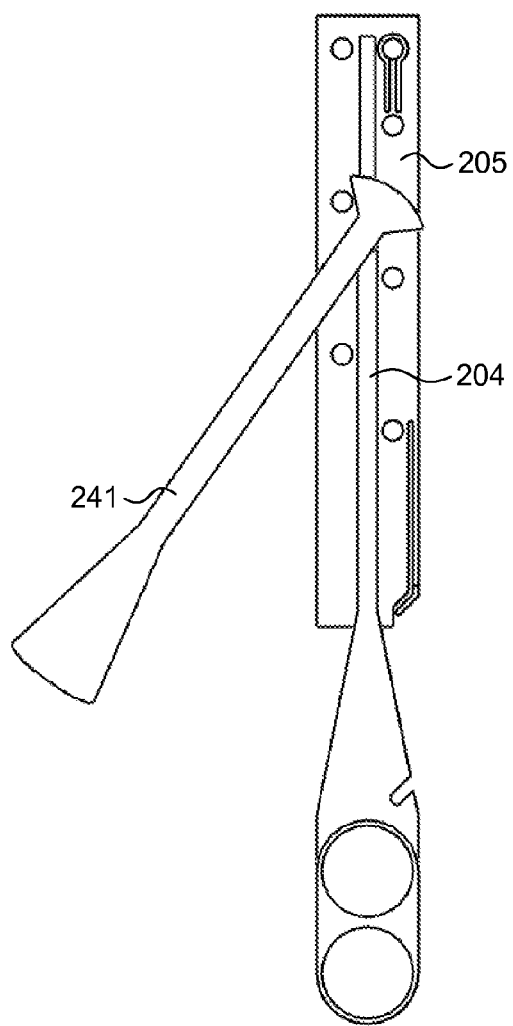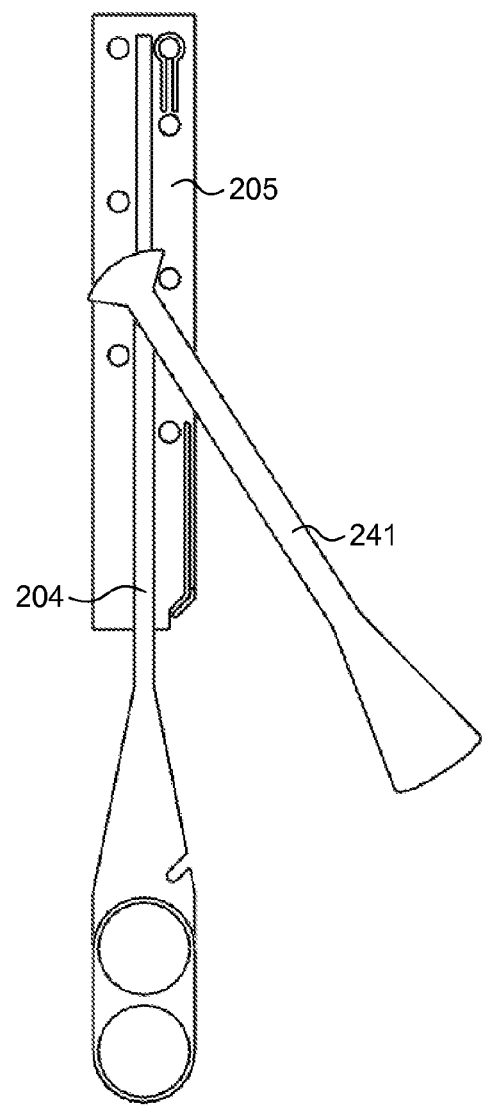
FIG. 21C
FIG. 21D

LINEAR ESCAPEMENTS, METHODS FOR MAKING, AND USE

RELATED APPLICATIONS

This application claims the benefit of U.S. Provisional Patent Application No. 61/162,854, filed Mar. 24, 2009 This related application is incorporated herein by reference as if set forth in full herein.

FIELD OF THE INVENTION

The present invention relates generally to the field of escapement mechanisms for providing mechanical control of motion based on desired timing criteria and more particularly to micro-scale and millimeter scale escapement mechanisms, and even more particularly to such mechanisms produced in whole or in part using multi-layer, multi-material electrochemical fabrication methods. In some embodiments, such escapement mechanisms are used in safing and arming applications for munitions or other explosive devices where two or more accelerations are present at appropriate times where after an arming delay occurs.

BACKGROUND OF THE INVENTION

Electrochemical Fabrication

An electrochemical fabrication technique for forming three-dimensional structures from a plurality of adhered layers is being commercially pursued by Microfabrica® Inc. (formerly MEMGen Corporation) of Van Nuys, Calif. under the name EFAB®.

Various electrochemical fabrication techniques were described in U.S. Pat. No. 6,027,630, issued on Feb. 22, 2000 to Adam Cohen. Some embodiments of this electrochemical fabrication technique allow the selective deposition of a material using a mask that includes a patterned conformable material on a support structure that is independent of the substrate onto which plating will occur. When desiring to perform an electrodeposition using the mask, the conformable portion of the mask is brought into contact with a substrate, but not adhered or bonded to the substrate, while in the presence of a plating solution such that the contact of the conformable portion of the mask to the substrate inhibits deposition at selected locations. For convenience, these masks might be generically called conformable contact masks; the masking technique may be generically called a conformable contact mask plating process. More specifically, in the terminology of Microfabrica Inc. such masks have come to be known as INSTANT MASKS™ and the process known as INSTANT MASKING™ or INSTANT MASK™ plating. Selective depositions using conformable contact mask plating may be used to form single selective deposits of material or may be used in a process to form multi-layer structures. The teachings of the '630 patent are hereby incorporated herein by reference as if set forth in full herein. Since the filing of the patent application that led to the above noted patent, various papers about conformable contact mask plating (i.e. INSTANT MASKING) and electrochemical fabrication have been published:

(1) A. Cohen, G. Zhang, F. Tseng, F. Mansfeld, U. Frodis and P. Will, "EFAB: Batch production of functional, fully-dense metal parts with micro-scale features", Proc. 9th Solid Freeform Fabrication, The University of Texas at Austin, p161, August 1998.

(2) A. Cohen, G. Zhang, F. Tseng, F. Mansfeld, U. Frodis and P. Will, "EFAB: Rapid, Low-Cost Desktop Micromachining of High Aspect Ratio True 3-D MEMS", Proc. 12th IEEE Micro Electro Mechanical Systems Workshop, IEEE, p244, January 1999.

(3) A. Cohen, "3-D Micromachining by Electrochemical Fabrication", Micromachine Devices, March 1999.

(4) G. Zhang, A. Cohen, U. Frodis, F. Tseng, F. Mansfeld, and P. Will, "EFAB: Rapid Desktop Manufacturing of True 3-D Microstructures", Proc. 2nd International Conference on Integrated MicroNanotechnology for Space Applications, The Aerospace Co., April 1999.

(5) F. Tseng, U. Frodis, G. Zhang, A. Cohen, F. Mansfeld, and P. Will, "EFAB: High Aspect Ratio, Arbitrary 3-D Metal Microstructures using a Low-Cost Automated Batch Process", 3rd International Workshop on High Aspect Ratio MicroStructure Technology (HARMST'99), June 1999.

(6) A. Cohen, U. Frodis, F. Tseng, G. Zhang, F. Mansfeld, and P. Will, "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, September 1999.

(7) F. Tseng, G. Zhang, U. Frodis, A. Cohen, F. Mansfeld, and P. Will, "EFAB: High Aspect Ratio, Arbitrary 3-D Metal Microstructures using a Low-Cost Automated Batch Process", MEMS Symposium, ASME 1999 International Mechanical Engineering Congress and Exposition, November, 1999.

(8) A. Cohen, "Electrochemical Fabrication (EFAB™)", Chapter 19 of The MEMS Handbook, edited by Mohamed Gad-El-Hak, CRC Press, 2002.

(9) Microfabrication—Rapid Prototyping's Killer Application", pages 1-5 of the Rapid Prototyping Report, CAD/CAM Publishing, Inc., June 1999.

The disclosures of these nine publications are hereby incorporated herein by reference as if set forth in full herein.

An electrochemical deposition for forming multilayer structures may be carried out in a number of different ways as set forth in the above patent and publications. In one form, this process involves the execution of three separate operations during the formation of each layer of the structure that is to be formed:

1. Selectively depositing at least one material by electrodeposition upon one or more desired regions of a substrate. Typically this material is either a structural material or a sacrificial material.

2. Then, blanket depositing at least one additional material by electrodeposition so that the additional deposit covers both the regions that were previously selectively deposited onto, and the regions of the substrate that did not receive any previously applied selective depositions. Typically this material is the other of a structural material or a sacrificial material.

3. Finally, planarizing the materials deposited during the first and second operations to produce a smoothed surface of a first layer of desired thickness having at least one region containing the at least one material and at least one region containing at least the one additional material.

After formation of the first layer, one or more additional layers may be formed adjacent to an immediately preceding layer and adhered to the smoothed surface of that preceding layer. These additional layers are formed by repeating the first through third operations one or more times wherein the formation of each subsequent layer treats the previously formed layers and the initial substrate as a new and thickening substrate.

Once the formation of all layers has been completed, at least a portion of at least one of the materials deposited is generally removed by an etching process to expose or release the three-dimensional structure that was intended to be formed. The removed material is a sacrificial material while the material that forms part of the desired structure is a structural material.

The preferred method of performing the selective electrodeposition involved in the first operation is by conformable contact mask plating. In this type of plating, one or more conformable contact (CC) masks are first formed. The CC masks include a support structure onto which a patterned conformable dielectric material is adhered or formed. The conformable material for each mask is shaped in accordance with a particular cross-section of material to be plated (the pattern of conformable material is complementary to the pattern of material to be deposited). At least one CC mask is used for each unique cross-sectional pattern that is to be plated.

The support for a CC mask is typically a plate-like structure formed of a metal that is to be selectively electroplated and from which material to be plated will be dissolved. In this typical approach, the support will act as an anode in an electroplating process. In an alternative approach, the support may instead be a porous or otherwise perforated material through which deposition material will pass during an electroplating operation on its way from a distal anode to a deposition surface. In either approach, it is possible for multiple CC masks to share a common support, i.e. the patterns of conformable dielectric material for plating multiple layers of material may be located in different areas of a single support structure. When a single support structure contains multiple plating patterns, the entire structure is referred to as the CC mask while the individual plating masks may be referred to as "submasks". In the present application such a distinction will be made only when relevant to a specific point being made.

In preparation for performing the selective deposition of the first operation, the conformable portion of the CC mask is placed in registration with and pressed against a selected portion of (1) the substrate, (2) a previously formed layer, or (3) a previously deposited portion of a layer on which deposition is to occur. The pressing together of the CC mask and relevant substrate occur in such a way that all openings, in the conformable portions of the CC mask contain plating solution. The conformable material of the CC mask that contacts the substrate acts as a barrier to electrodeposition while the openings in the CC mask that are filled with electroplating solution act as pathways for transferring material from an anode (e.g. the CC mask support) to the non-contacted portions of the substrate (which act as a cathode during the plating operation) when an appropriate potential and/or current are supplied.

An example of a CC mask and CC mask plating are shown in FIGS. 1A-1C. FIG. 1A shows a side view of a CC mask 8 consisting of a conformable or deformable (e.g. elastomeric) insulator 10 patterned on an anode 12. The anode has two functions. One is as a supporting material for the patterned insulator 10 to maintain its integrity and alignment since the pattern may be topologically complex (e.g., involving isolated "islands" of insulator material). The other function is as an anode for the electroplating operation. FIG. 1A also depicts a substrate 6, separated from mask 8, onto which material will be deposited during the process of forming a layer. CC mask plating selectively deposits material 22 onto substrate 6 by simply pressing the insulator against the substrate then electrodepositing material through apertures 26a and 26b in the insulator as shown in FIG. 1B. After deposition, the CC mask is separated, preferably non-destructively, from the substrate 6 as shown in FIG. 10.

The CC mask plating process is distinct from a "through-mask" plating process in that in a through-mask plating process the separation of the masking material from the substrate would occur destructively. Furthermore in a through mask plating process, opening in the masking material are typically formed while the masking material is in contact with and adhered to the substrate. As with through-mask plating, CC mask plating deposits material selectively and simultaneously over the entire layer. The plated region may consist of one or more isolated plating regions where these isolated plating regions may belong to a single structure that is being formed or may belong to multiple structures that are being formed simultaneously. In CC mask plating as individual masks are not intentionally destroyed in the removal process, they may be usable in multiple plating operations.

Another example of a CC mask and CC mask plating is shown in FIGS. 1D-1G. FIG. 1D shows an anode 12' separated from a mask 8' that includes a patterned conformable material 10' and a support structure 20. FIG. 1D also depicts substrate 6 separated from the mask 8'. FIG. 1E illustrates the mask 8' being brought into contact with the substrate 6. FIG. 1F illustrates the deposit 22' that results from conducting a current from the anode 12' to the substrate 6. FIG. 1G illustrates the deposit 22' on substrate 6 after separation from mask 8'. In this example, an appropriate electrolyte is located between the substrate 6 and the anode 12' and a current of ions coming from one or both of the solution and the anode are conducted through the opening in the mask to the substrate where material is deposited. This type of mask may be referred to as an anodeless INSTANT MASK™ (AIM) or as an anodeless conformable contact (ACC) mask.

Unlike through-mask plating, CC mask plating allows CC masks to be formed completely separate from the substrate on which plating is to occur (e.g. separate from a three-dimensional (3D) structure that is being formed). CC masks may be formed in a variety of ways, for example, using a photolithographic process. All masks can be generated simultaneously, e.g. prior to structure fabrication rather than during it. This separation makes possible a simple, low-cost, automated, self-contained, and internally-clean "desktop factory" that can be installed almost anywhere to fabricate 3D structures, leaving any required clean room processes, such as photolithography to be performed by service bureaus or the like.

An example of the electrochemical fabrication process discussed above is illustrated in FIGS. 2A-2F. These figures show that the process involves deposition of a first material 2 which is a sacrificial material and a second material 4 which is a structural material. The CC mask 8, in this example, includes a patterned conformable material (e.g. an elastomeric dielectric material) 10 and a support 12 which is made from deposition material 2. The conformal portion of the CC mask is pressed against substrate 6 with a plating solution 14 located within the openings 16 in the conformable material 10. An electric current, from power supply 18, is then passed through the plating solution 14 via (a) support 12 which doubles as an anode and (b) substrate 6 which doubles as a cathode. FIG. 2A illustrates that the passing of current causes material 2 within the plating solution and material 2 from the anode 12 to be selectively transferred to and plated on the substrate 6. After electroplating the first deposition material 2 onto the substrate 6 using CC mask 8, the CC mask 8 is removed as shown in FIG. 2B. FIG. 2C depicts the second deposition material 4 as having been blanket-deposited (i.e.

non-selectively deposited) over the previously deposited first deposition material 2 as well as over the other portions of the substrate 6. The blanket deposition occurs by electroplating from an anode (not shown), composed of the second material, through an appropriate plating solution (not shown), and to the cathode/substrate 6. The entire two-material layer is then planarized to achieve precise thickness and flatness as shown in FIG. 2D. After repetition of this process for all layers, the multi-layer structure 20 formed of the second material 4 (i.e. structural material) is embedded in first material 2 (i.e. sacrificial material) as shown in FIG. 2E. The embedded structure is etched to yield the desired device, i.e. structure 20, as shown in FIG. 2F.

Various components of an exemplary manual electrochemical fabrication system 32 are shown in FIGS. 3A-3C. The system 32 consists of several subsystems 34, 36, 38, and 40. The substrate holding subsystem 34 is depicted in the upper portions of each of FIGS. 3A-3C and includes several components: (1) a carrier 48, (2) a metal substrate 6 onto which the layers are deposited, and (3) a linear slide 42 capable of moving the substrate 6 up and down relative to the carrier 48 in response to drive force from actuator 44. Subsystem 34 also includes an indicator 46 for measuring differences in vertical position of the substrate which may be used in setting or determining layer thicknesses and/or deposition thicknesses. The subsystem 34 further includes feet 68 for carrier 48 which can be precisely mounted on subsystem 36.

The CC mask subsystem 36 shown in the lower portion of FIG. 3A includes several components: (1) a CC mask 8 that is actually made up of a number of CC masks (i.e. submasks) that share a common support/anode 12, (2) precision X-stage 54, (3) precision Y-stage 56, (4) frame 72 on which the feet 68 of subsystem 34 can mount, and (5) a tank 58 for containing the electrolyte 16. Subsystems 34 and 36 also include appropriate electrical connections (not shown) for connecting to an appropriate power source (not shown) for driving the CC masking process.

The blanket deposition subsystem 38 is shown in the lower portion of FIG. 3B and includes several components: (1) an anode 62, (2) an electrolyte tank 64 for holding plating solution 66, and (3) frame 74 on which feet 68 of subsystem 34 may sit. Subsystem 38 also includes appropriate electrical connections (not shown) for connecting the anode to an appropriate power supply (not shown) for driving the blanket deposition process.

The planarization subsystem 40 is shown in the lower portion of FIG. 3C and includes a lapping plate 52 and associated motion and control systems (not shown) for planarizing the depositions.

In addition to teaching the use of CC masks for electrodeposition purposes, the '630 patent also teaches that the CC masks may be placed against a substrate with the polarity of the voltage reversed and material may thereby be selectively removed from the substrate. It indicates that such removal processes can be used to selectively etch, engrave, and polish a substrate, e.g., a plaque.

The '630 patent further indicates that the electroplating methods and articles disclosed therein allow fabrication of devices from thin layers of materials such as, e.g., metals, polymers, ceramics, and semiconductor materials. It further indicates that although the electroplating embodiments described therein have been described with respect to the use of two metals, a variety of materials, e.g., polymers, ceramics and semiconductor materials, and any number of metals can be deposited either by the electroplating methods therein, or in separate processes that occur throughout the electroplating method. It indicates that a thin plating base can be deposited, e.g., by sputtering, over a deposit that is insufficiently conductive (e.g., an insulating layer) so as to enable subsequent electroplating. It also indicates that multiple support materials (i.e. sacrificial materials) can be included in the electroplated element allowing selective removal of the support materials.

The '630 patent additionally teaches that the electroplating methods disclosed therein can be used to manufacture elements having complex microstructure and close tolerances between parts. An example is given with the aid of FIGS. 14A-14E of that patent. In the example, elements having parts that fit with close tolerances, e.g., having gaps between about 1-5 um, including electroplating the parts of the device in an unassembled, preferably pre-aligned, state and once fabricated. In such embodiments, the individual parts can be moved into operational relation with each other or they can simply fall together. Once together the separate parts may be retained by clips or the like.

Another method for forming microstructures from electroplated metals (i.e. using electrochemical fabrication techniques) is taught in U.S. Pat. No. 5,190,637 to Henry Guckel, entitled "Formation of Microstructures by Multiple Level Deep X-ray Lithography with Sacrificial Metal layers". This patent teaches the formation of metal structure utilizing through mask exposures. A first layer of a primary metal is electroplated onto an exposed plating base to fill a void in a photoresist (the photoresist forming a through mask having a desired pattern of openings), the photoresist is then removed and a secondary metal is electroplated over the first layer and over the plating base. The exposed surface of the secondary metal is then machined down to a height which exposes the first metal to produce a flat uniform surface extending across both the primary and secondary metals. Formation of a second layer may then begin by applying a photoresist over the first layer and patterning it (i.e. to form a second through mask) and then repeating the process that was used to produce the first layer to produce a second layer of desired configuration. The process is repeated until the entire structure is formed and the secondary metal is removed by etching. The photoresist is formed over the plating base or previous layer by casting and patterning of the photoresist (i.e. voids formed in the photoresist) are formed by exposure of the photoresist through a patterned mask via X-rays or UV radiation and development of the exposed or unexposed areas.

The '637 patent teaches the locating of a plating base onto a substrate in preparation for electroplating materials onto the substrate. The plating base is indicated as typically involving the use of a sputtered film of an adhesive metal, such as chromium or titanium, and then a sputtered film of the metal that is to be plated. It is also taught that the plating base may be applied over an initial layer of sacrificial material (i.e. a layer or coating of a single material) on the substrate so that the structure and substrate may be detached if desired. In such cases after formation of the structure the sacrificial material forming part of each layer of the structure may be removed along the initial sacrificial layer to free the structure. Substrate materials mentioned in the '637 patent include silicon, glass, metals, and silicon with protected semiconductor devices. A specific example of a plating base includes about 150 angstroms of titanium and about 300 angstroms of nickel, both of which are sputtered at a temperature of 160° C. In another example it is indicated that the plating base may consist of 150 angstroms of titanium and 150 angstroms of nickel where both are applied by sputtering.

Electrochemical Fabrication provides the ability to form prototypes and commercial quantities of miniature objects, parts, structures, devices, and the like at reasonable costs and in reasonable times. In fact, Electrochemical Fabrication is an enabler for the formation of many structures that were hitherto impossible to produce. Electrochemical Fabrication opens the spectrum for new designs and products in many industrial fields. Even though Electrochemical Fabrication offers this new capability and it is understood that Electrochemical Fabrication techniques can be combined with designs and structures known within various fields to produce new structures, certain uses for Electrochemical Fabrication provide designs, structures, capabilities and/or features not known or obvious in view of the state of the art.

A need exists in various fields for miniature devices having improved characteristics, reduced fabrication times, reduced fabrication costs, simplified fabrication processes, greater versatility in device design, improved selection of materials, improved material properties, more cost effective and less risky production of such devices, and/or more independence between geometric configuration and the selected fabrication process.

SUMMARY OF THE INVENTION

It is an object of some embodiments of the invention to provide an improved method for forming multi-layer three-dimensional meso-scale or micro-scale escapement devices wherein multiple components of the device are formed in an as assembled configuration.

It is an object of some embodiments of the invention to provide an improved meso-scale or microscale escapement device.

Other objects and advantages of various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively may address some other object ascertained from the teachings herein. It is not necessarily intended that all objects be addressed by any single aspect of the invention even though that may be the case with regard to some aspects.

A first aspect of the invention provides a mechanical safing and arming mechanism, including: (a) a frame having a longitudinal axis, (b) a shaft configured to move along a substantially linear path relative to the frame in a direction parallel to the longitudinal axis of the frame and carrying an arming cell, (c) a pendulum pivotably connected to the shaft and configured to undergo oscillation relative to the shaft; (d) a first latch for releasably hindering at least a certain motion of the pendulum relative to the shaft; (e) a second latch for releasably hindering at least a certain motion of the shaft relative to the frame; wherein as a result of a trigger event the first and second latches are released and the mechanism moves the arming cell from a safe location to an armed location by the motion of the shaft relative to the frame wherein the timing of the movement of the shaft relative to the frame from the safe location to the armed location is controlled by the motion of the pendulum.

A second aspect of the invention provides a method of arming an explosive device, including: (a) initiating a mechanical trigger event; (b) mechanically releasing first and second retention latches of a safing and arming mechanism as a result of the trigger event; (c) moving a shaft carrying an arming cell relative to a frame from a safe position to a armed position, after release of the first and second retention latches, to align a primer charge in the arming cell with a firing mechanism and a main explosive charge; wherein the movement of the shaft relative to the frame is controlled by the oscillation of a pendulum that is pivotably attached to the shaft.

The disclosure of the present invention provides two primary embodiments for escapement mechanisms which are formable from a plurality of adhered layers of materials with each successive layer comprising at least two materials, one of which is a structural material and the other of which is a sacrificial material, and wherein each successive layer defines a successive cross-section of the three-dimensional structure, and wherein the forming of each of the plurality of successive layers includes: (i) depositing a first of the at least two materials; (ii) depositing a second of the at least two materials; (iii) optionally planarizing the first and second deposited materials to form a layer having a common surface level with the first and second materials located in different lateral positions of the layer; and (B) after the forming of the plurality of successive layers, separating at least a portion of the sacrificial material from multiple layers of the structural material to reveal the three-dimensional structure.

Other aspects of the invention will be understood by those of skill in the art upon review of the teachings herein. Other aspects of the invention may involve combinations of the above noted aspects of the invention. These other aspects of the invention may provide various combinations of the aspects presented above as well as provide other configurations, structures, functional relationships, and processes that have not been specifically set forth above.

BRIEF DESCRIPTION OF THE DRAWINGS

FIGS. 2A-2F schematically depict side views of various stages of an electrochemical fabrication process as applied to the formation of a particular structure where a sacrificial material is selectively deposited while a structural material is blanket deposited.

FIGS. 5A and 5B provide back and front views of an escapement mechanism including a mass cell and an arming cell according to a first embodiment of the invention wherein the mechanism is actuated by a substantially simultaneous linear acceleration and rotation about a central point which causes release of both an out of plane retention latch and a rotational retention latch wherein the forces for driving the movement of the escapement arise from a launch acceleration of a carrier or munition and a rotation of the carrier or munition as it is launched.

FIGS. 9A and 9B provide close up side and back views of the out of plane lock including the mounting flexure or arm, the inertial mass, and the engagement latch wherein during operation (i.e. in response to accelerations that lead to the disengagement of both latches) the gear rack moves downward such that the engagement latch move above the upper (or distal) end of the gear rack thus allowing the gear rack to move relative to the escapement frame under the timing dictated by the movement of the escapement arm.

FIGS. 21A-21G provide schematic illustrations of the mechanism of the second embodiment at a plurality of different states as the pendulum and shaft move from an initial position (e.g. safe position) to a final position (e.g. an enabled or armed position), wherein FIG. 21A depicts the state of the process after the pendulum rocks to the left after release of the rotational lock, FIG. 21B depicts the state of the process after release of the linear lock and the pendulum has slipped past the first stop pin (on the left), engaged the second stop pin (on the right) and pivoted to the right, FIG. 21C depicts the state of the process after the pendulum engages the third pin (on the left) and pivots to the left, FIG. 21D depicts the state of the process after the pendulum has engaged the forth pin (on the right) and pivoted to the right, FIG. 21E depicts the state of the process after the pendulum engages the fifth pin (on the left) and pivots to the left, FIG. 21F depicts the state of the process after the pendulum has engaged the sixth pin (on the right) and pivoted to the right, and finally FIG. 21G shows the state of the process after the pendulum has moved past the last pin and settled in line with the shaft FIG. 22 provides a close up section view of the pivot for the pendulum and joined bumper of the mechanism of the second embodiment.

FIGS. 27A-27F depicts the shaft, pendulum, and frame at different states of the process of deployment as the shaft carrying the arming cell moves from a safe position to an armed position, wherein FIG. 27A depicts the state of the before the shaft has moved longitudinally and before the pendulum has begun its rocking, FIG. 27B depicts the state of the process after the pendulum as rocked to the right (upward in the figure) and the pin as moved along an initial left side curved path, FIG. 27C depicts the state of the process after the pendulum as rocked to the right (upward in the figure) and the pin has moved along a right side curved path, FIG. 27D depicts the state of the process after the pendulum as rocked again to the right (upward in the figure) and the pin as moved along a subsequent left side curved path, FIG. 27E depicts the state of the process after the pendulum as rocked to the left along a subsequent and the pin has moved along a subsequent, and wherein FIG. 27F depicts the state of the process after the pendulum has rocked back and forth a sufficient number of times to cause the pin to reach the end of the meandering path and the arming cell to be placed in an engaged or armed position.

DETAILED DESCRIPTION OF PREFERRED EMBODIMENTS

Electrochemical Fabrication in General

FIGS. 1A-1G, 2A-2F, and 3A-3C illustrate various features of one form of electrochemical fabrication. Other electrochemical fabrication techniques are set forth in the '630 patent referenced above, in the various previously incorporated publications, in various other patents and patent applications incorporated herein by reference. Still others may be derived from combinations of various approaches described in these publications, patents, and applications, or are otherwise known or ascertainable by those of skill in the art from the teachings set forth herein. All of these techniques may be combined with those of the various embodiments of various aspects of the invention to yield enhanced embodiments. Still other embodiments may be derived from combinations of the various embodiments explicitly set forth herein.

Figure 1A:
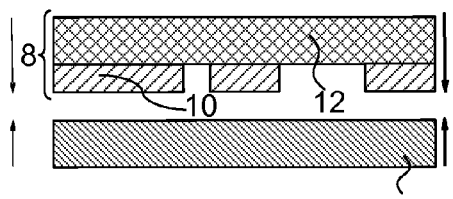
FIGS. 1A-1C schematically depict side views of various stages of a CC mask plating process, while FIGS. 1D-G schematically depict a side views of various stages of a CC mask plating process using a different type of CC mask.
Figure 1B:
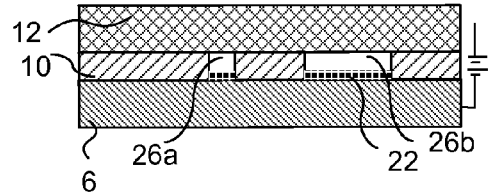
Figure 1C:
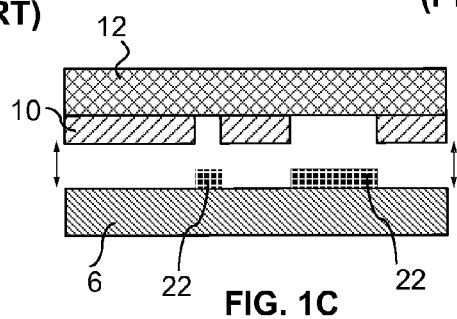
Figure 1D:
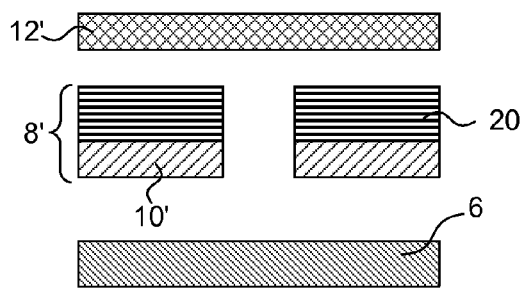
Figure 1E:
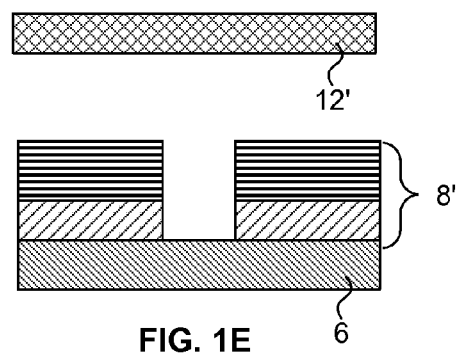
Figure 1F:
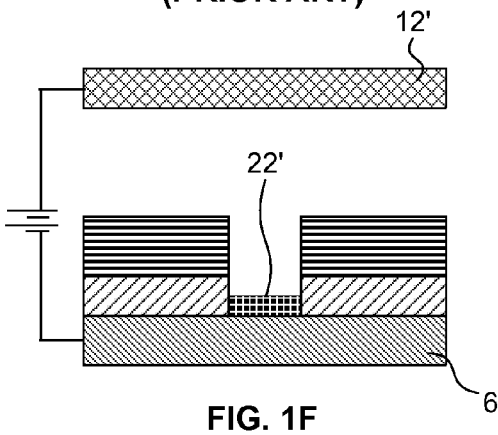
Figure 1G:
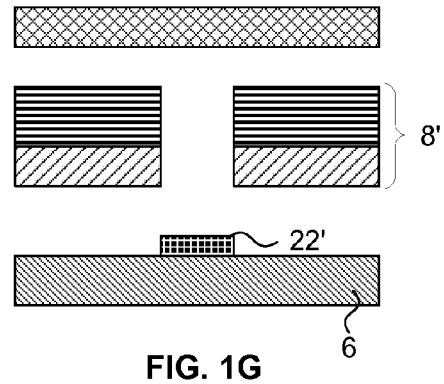
Figure 3A:
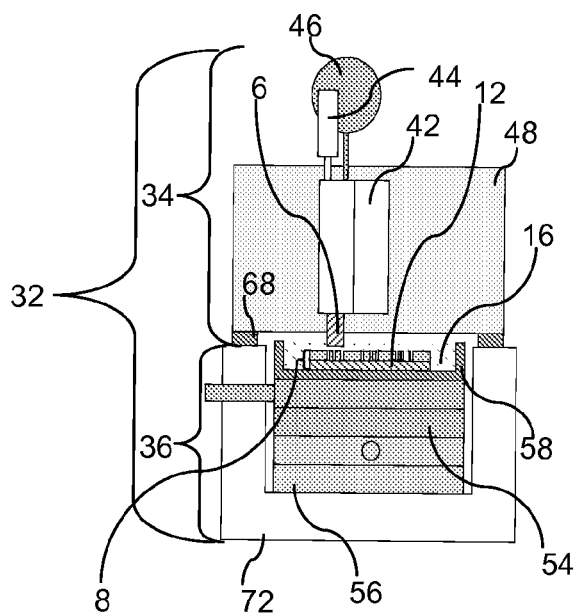
FIGS. 3A-3C schematically depict side views of various example subassemblies that may be used in manually implementing the electrochemical fabrication method depicted in FIGS. 2A-2F.
Figure 3B:
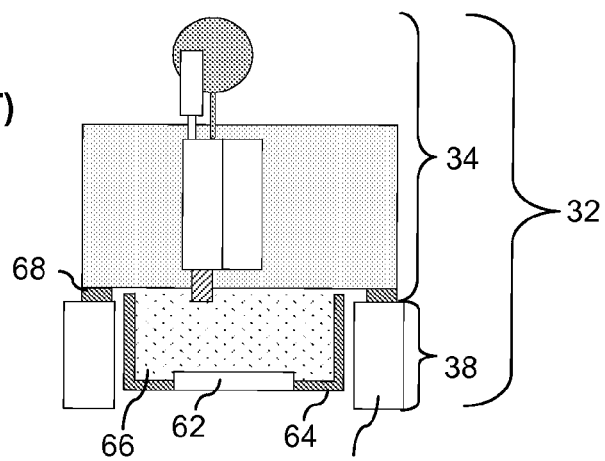
Figure 3C:
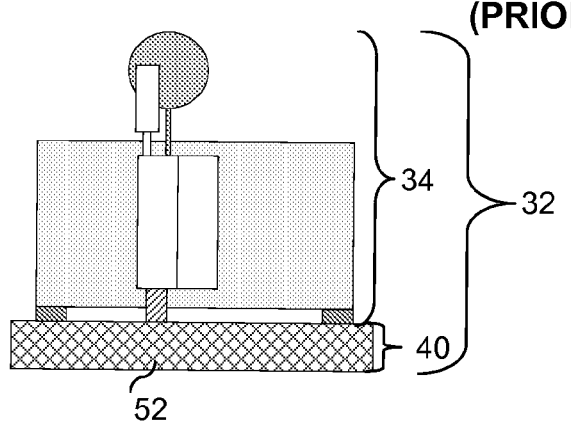
Figure 4A:
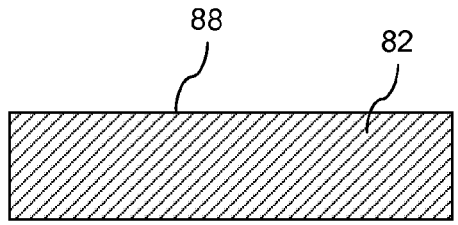
FIGS. 4A-4F schematically depict the formation of a first layer of a structure using adhered mask plating where the blanket deposition of a second material overlays both the openings between deposition locations of a first material and the first material itself
Figure 4B:
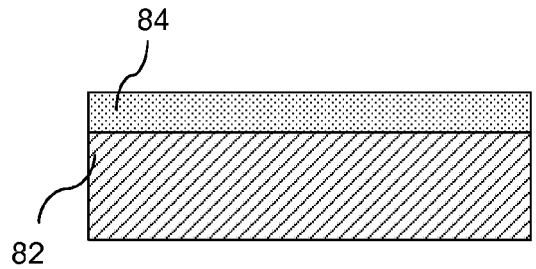
Figure 4C:
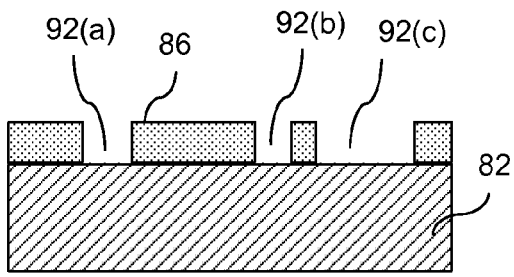
Figure 4D:
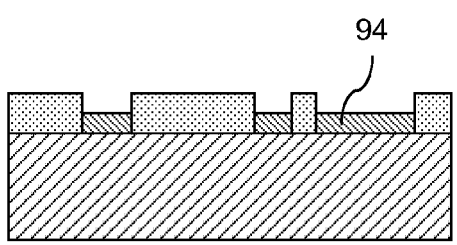
Figure 4E:
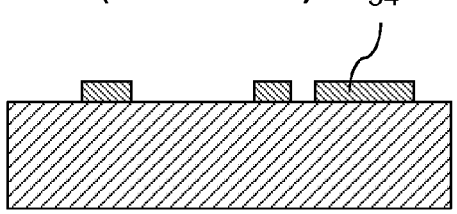
Figure 4F:
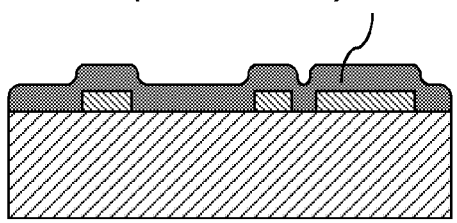
Figure 4G:
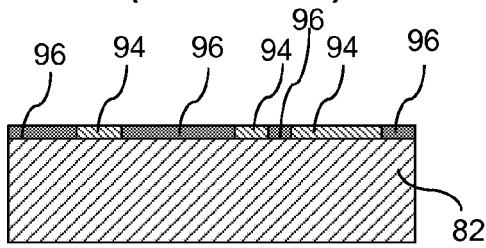
FIG. 4G depicts the completion of formation of the first layer resulting from planarizing the deposited materials to a desired level.
Figure 4H:
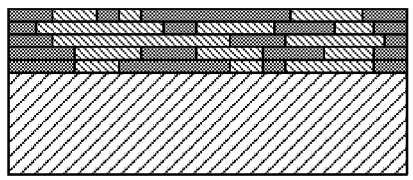
FIGS. 4H and 4I respectively depict the state of the process after formation of the multiple layers of the structure and after release of the structure from the sacrificial material.
Figure 4I:
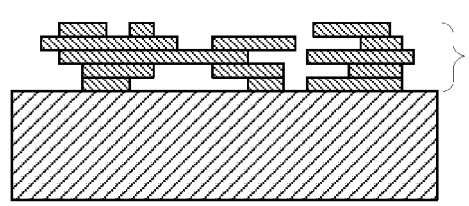

FIGS. 4A-4I illustrate various stages in the formation of a single layer of a multi-layer fabrication process where a second metal is deposited on a first metal as well as in openings in the first metal so that the first and second metal form part of the layer. In FIG. 4A a side view of a substrate 82 is shown, onto which patternable photoresist 84 is cast as shown in FIG. 4B. In FIG. 4C, a pattern of resist is shown that results from the curing, exposing, and developing of the resist. The patterning of the photoresist 84 results in openings or apertures 92(a)-92(c) extending from a surface 86 of the photoresist through the thickness of the photoresist to surface 88 of the substrate 82. In FIG. 4D a metal 94 (e.g. nickel) is shown as having been electroplated into the openings 92(a)-92(c). In FIG. 4E the photoresist has been removed (i.e. chemically stripped) from the substrate to expose regions of the substrate 82 which are not covered with the first metal 94. In FIG. 4F a second metal 96 (e.g. silver) is shown as having been blanket electroplated over the entire exposed portions of the substrate 82 (which is conductive) and over the first metal 94 (which is also conductive). FIG. 4G depicts the completed first layer of the structure which has resulted from the planarization of the first and second metals down to a height that exposes the first metal and sets a thickness for the first layer. In FIG. 4H the result of repeating the process steps shown in FIGS. 4B-4G several times to form a multi-layer structure are shown where each layer consists of two materials. For most applications, one of these materials is removed as shown in FIG. 4I to yield a desired 3-D structure 98 (e.g. component or device).

Various embodiments of various aspects of the invention are directed to formation of three-dimensional structures from materials some of which may be electrodeposited or electroless deposited. Some of these structures may be formed form a single build level formed from one or more deposited materials while others are formed from a plurality of build layers each including at least two materials (e.g. two or more layers, more preferably five or more layers, and most preferably ten or more layers). In some embodiments, layer thicknesses may be as small as one micron or as large as fifty microns. In other embodiments, thinner layers may be used while in other embodiments, thicker layers may be used. In some embodiments structures having features positioned with micron level precision and minimum features size on the order of tens of microns are to be formed. In other embodiments structures with less precise feature placement and/or larger minimum features may be formed. In still other embodiments, higher precision and smaller minimum feature sizes may be desirable. In the present application meso-scale and millimeter scale have the same meaning and refer to devices that may have one or more dimensions extending into the 0.5-20 millimeter range, or somewhat larger and with features positioned with precision in the 10-100 micron range and with minimum features sizes on the order of 100 microns.

The various embodiments, alternatives, and techniques disclosed herein may form multi-layer structures using a single patterning technique on all layers or using different patterning techniques on different layers. For example, Various embodiments of the invention may perform selective patterning operations using conformable contact masks and masking operations (i.e. operations that use masks which are contacted to but not adhered to a substrate), proximity masks and masking operations (i.e. operations that use masks that at least partially selectively shield a substrate by their proximity to the substrate even if contact is not made), non-conformable masks and masking operations (i.e. masks and operations based on masks whose contact surfaces are not significantly conformable), and/or adhered masks and masking operations (masks and operations that use masks that are adhered to a substrate onto which selective deposition or etching is to occur as opposed to only being contacted to it). Conformable contact masks, proximity masks, and non-conformable contact masks share the property that they are preformed and brought to, or in proximity to, a surface which is to be treated (i.e. the exposed portions of the surface are to be treated). These masks can generally be removed without damaging the mask or the surface that received treatment to which they were contacted, or located in proximity to. Adhered masks are generally formed on the surface to be treated (i.e. the portion of that surface that is to be masked) and bonded to that surface such that they cannot be separated from that surface without being completely destroyed damaged beyond any point of reuse. Adhered masks may be formed in a number of ways including (1) by application of a photoresist, selective exposure of the photoresist, and then development of the photoresist, (2) selective transfer of pre-patterned masking material, and/or (3) direct formation of masks from computer controlled depositions of material.

Patterning operations may be used in selectively depositing material and/or may be used in the selective etching of material. Selectively etched regions may be selectively filled in or filled in via blanket deposition, or the like, with a different desired material. In some embodiments, the layer-by-layer build up may involve the simultaneous formation of portions of multiple layers. In some embodiments, depositions made in association with some layer levels may result in depositions to regions associated with other layer levels (i.e. regions that lie within the top and bottom boundary levels that define a different layer's geometric configuration). Such use of selective etching and interlaced material deposition in association with multiple layers is described in U.S. patent application Ser. No. 10/434,519, by Smalley, now U.S. Pat. No. 7,252,861, and entitled "Methods of and Apparatus for Electrochemically Fabricating Structures Via Interlaced Layers or Via Selective Etching and Filling of Voids layer elements" which is hereby incorporated herein by reference as if set forth in full.

Temporary substrates on which structures may be formed may be of the sacrificial-type (i.e. destroyed or damaged during separation of deposited materials to the extent they can not be reused), non-sacrificial-type (i.e. not destroyed or excessively damaged, i.e. not damaged to the extent they may not be reused, e.g. with a sacrificial or release layer located between the substrate and the initial layers of a structure that is formed). Non-sacrificial substrates may be considered reusable, with little or no rework (e.g. replanarizing one or more selected surfaces or applying a release layer, and the like) though they may or may not be reused for a variety of reasons.

DEFINITIONS

This section of the specification is intended to set forth definitions for a number of specific terms that may be useful in describing the subject matter of the various embodiments of the invention. It is believed that the meanings of most if not all of these terms is clear from their general use in the specification but they are set forth hereinafter to remove any ambiguity that may exist. It is intended that these definitions be used in understanding the scope and limits of any claims that use these specific terms. As far as interpretation of the claims of this patent disclosure are concerned, it is intended that these definitions take presence over any contradictory definitions or allusions found in any materials which are incorporated herein by reference.

"Build" as used herein refers, as a verb, to the process of building a desired structure or plurality of structures from a plurality of applied or deposited materials which are stacked and adhered upon application or deposition or, as a noun, to the physical structure or structures formed from such a process. Depending on the context in which the term is used, such physical structures may include a desired structure embedded within a sacrificial material or may include only desired physical structures which may be separated from one another or may require dicing and/or slicing to cause separation.

"Build axis" or "build orientation" is the axis or orientation that is substantially perpendicular to substantially planar levels of deposited or applied materials that are used in building up a structure. The planar levels of deposited or applied materials may be or may not be completely planar but are substantially so in that the overall extent of their cross-sectional dimensions are significantly greater than the height of any individual deposit or application of material (e.g. 100, 500, 1000, 5000, or more times greater). The planar nature of the deposited or applied materials may come about from use of a process that leads to planar deposits or it may result from a planarization process (e.g. a process that includes mechanical abrasion, e.g. lapping, fly cutting, grinding, or the like) that is used to remove material regions of excess height.

Unless explicitly noted otherwise, "vertical" as used herein refers to the build axis or nominal build axis (if the layers are not stacking with perfect registration) while "horizontal" refers to a direction within the plane of the layers (i.e. the plane that is substantially perpendicular to the build axis).

"Build layer" or "layer of structure" as used herein does not refer to a deposit of a specific material but instead refers to a region of a build located between a lower boundary level and an upper boundary level which generally defines a single cross-section of a structure being formed or structures which are being formed in parallel. Depending on the details of the actual process used to form the structure, build layers are generally formed on and adhered to previously formed build layers. In some processes the boundaries between build layers are defined by planarization operations which result in successive build layers being formed on substantially planar upper surfaces of previously formed build layers. In some embodiments, the substantially planar upper surface of the preceding build layer may be textured to improve adhesion between the layers. In other build processes, openings may exist in or be formed in the upper surface of a previous but only partially formed build layers such that the openings in the previous build layers are filled with materials deposited in association with current build layers which will cause interlacing of build layers and material deposits. Such interlacing is described in U.S. patent application Ser. No. 10/434,519 now U.S. Pat. No. 7,252,861. This referenced application is incorporated herein by reference as if set forth in full. In most embodiments, a build layer includes at least one primary structural material and at least one primary sacrificial material. However, in some embodiments, two or more primary structural materials may used without a primary sacrificial material (e.g. when one primary structural material is a dielectric and the other is a conductive material). In some embodiments, build layers are distinguishable from each other by the source of the data that is used to yield patterns of the deposits, applications, and/or etchings of material that form the respective build layers. For example, data descriptive of a structure to be formed which is derived from data extracted from different vertical levels of a data representation of the structure define different build layers of the structure. The vertical separation of successive pairs of such descriptive data may define the thickness of build layers associated with the data. As used herein, at times, "build layer" may be loosely referred simply as "layer". In many embodiments, deposition thickness of primary structural or sacrificial materials (i.e. the thickness of any particular material after it is deposited) is generally greater than the layer thickness and a net deposit thickness is set via one or more planarization processes which may include, for example, mechanical abrasion (e.g. lapping, fly cutting, polishing, and the like) and/or chemical etching (e.g. using selective or non-selective etchants). The lower boundary and upper boundary for a build layer may be set and defined in different ways. From a design point of view they may be set based on a desired vertical resolution of the structure (which may vary with height). From a data manipulation point of view, the vertical layer boundaries may be defined as the vertical levels at which data descriptive of the structure is processed or the layer thickness may be defined as the height separating successive levels of cross-sectional data that dictate how the structure will be formed. From a fabrication point of view, depending on the exact fabrication process used, the upper and lower layer boundaries may be defined in a variety of different ways. For example by planarization levels or effective planarization levels (e.g. lapping levels, fly cutting levels, chemical mechanical polishing levels, mechanical polishing levels, vertical positions of structural and/or sacrificial materials after relatively uniform etch back following a mechanical or chemical mechanical planarization process). For example, by levels at which process steps or operations are repeated. At levels at which, at least theoretically, lateral extends of structural material can be changed to define new cross-sectional features of a structure.

"Layer thickness" is the height along the build axis between a lower boundary of a build layer and an upper boundary of that build layer.

"Planarization" is a process that tends to remove materials, above a desired plane, in a substantially non-selective manner such that all deposited materials are brought to a substantially common height or desired level (e.g. within 20%, 10%, 5%, or even 1% of a desired layer boundary level). For example, lapping removes material in a substantially non-selective manner though some amount of recession one material or another may occur (e.g. copper may recess relative to nickel). Planarization may occur primarily via mechanical means, e.g. lapping, grinding, fly cutting, milling, sanding, abrasive polishing, frictionally induced melting, other machining operations, or the like (i.e. mechanical planarization). Mechanical planarization maybe followed or proceeded by thermally induced planarization (e.g. melting) or chemically induced planarization (e.g. etching). Planarization may occur primarily via a chemical and/or electrical means (e.g. chemical etching, electrochemical etching, or the like). Planarization may occur via a simultaneous combination of mechanical and chemical etching (e.g. chemical mechanical polishing (CMP)).

"Structural material" as used herein refers to a material that remains part of the structure when put into use.

"Supplemental structural material" as used herein refers to a material that forms part of the structure when the structure is put to use but is not added as part of the build layers but instead is added to a plurality of layers simultaneously (e.g. via one or more coating operations that applies the material, selectively or in a blanket fashion, to a one or more surfaces of a desired build structure that has been released from a sacrificial material.

"Primary structural material" as used herein is a structural material that forms part of a given build layer and which is typically deposited or applied during the formation of that build layer and which makes up more than 20% of the structural material volume of the given build layer. In some embodiments, the primary structural material may be the same on each of a plurality of build layers or it may be different on different build layers. In some embodiments, a given primary structural material may be formed from two or more materials by the alloying or diffusion of two or more materials to form a single material.

"Secondary structural material" as used herein is a structural material that forms part of a given build layer and is typically deposited or applied during the formation of the given build layer but is not a primary structural material as it individually accounts for only a small volume of the structural material associated with the given layer. A secondary structural material will account for less than 20% of the volume of the structural material associated with the given layer. In some preferred embodiments, each secondary structural material may account for less than 10%, 5%, or even 2% of the volume of the structural material associated with the given layer. Examples of secondary structural materials may include seed layer materials, adhesion layer materials, barrier layer materials (e.g. diffusion barrier material), and the like. These secondary structural materials are typically applied to form coatings having thicknesses less than 2 microns, 1 micron, 0.5 microns, or even 0.2 microns). The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No. 7,195,989. These referenced applications are incorporated herein by reference as if set forth in full herein.

"Functional structural material" as used herein is a structural material that would have been removed as a sacrificial material but for its actual or effective encapsulation by other structural materials. Effective encapsulation refers, for example, to the inability of an etchant to attack the functional structural material due to inaccessibility that results from a very small area of exposure and/or due to an elongated or tortuous exposure path. For example, large (10,000 $\mu m^2$) but thin (e.g. less than 0.5 microns) regions of sacrificial copper sandwiched between deposits of nickel may define regions of functional structural material depending on ability of a release etchant to remove the sandwiched copper.

"Sacrificial material" is material that forms part of a build layer but is not a structural material. Sacrificial material on a given build layer is separated from structural material on that build layer after formation of that build layer is completed and more generally is removed from a plurality of layers after completion of the formation of the plurality of layers during a "release" process that removes the bulk of the sacrificial material or materials. In general sacrificial material is located on a build layer during the formation of one, two, or more subsequent build layers and is thereafter removed in a manner that does not lead to a planarized surface. Materials that are applied primarily for masking purposes, i.e. to allow subsequent selective deposition or etching of a material, e.g. photoresist that is used in forming a build layer but does not form part of the build layer) or that exist as part of a build for less than one or two complete build layer formation cycles are not considered sacrificial materials as the term is used herein but instead shall be referred as masking materials or as temporary materials. These separation processes are sometimes referred to as a release process and may or may not involve the separation of structural material from a build substrate. In many embodiments, sacrificial material within a given build layer is not removed until all build layers making up the three-dimensional structure have been formed. Of course sacrificial material may be, and typically is, removed from above the upper level of a current build layer during planarization operations during the formation of the current build layer. Sacrificial material is typically removed via a chemical etching operation but in some embodiments may be removed via a melting operation or electrochemical etching operation. In typical structures, the removal of the sacrificial material (i.e. release of the structural material from the sacrificial material) does not result in planarized surfaces but instead results in surfaces that are dictated by the boundaries of structural materials located on each build layer. Sacrificial materials are typically distinct from structural materials by having different properties therefrom (e.g. chemical etchability, hardness, melting point, etc.) but in some cases, as noted previously, what would have been a sacrificial material may become a structural material by its actual or effective encapsulation by other structural materials. Similarly, structural materials may be used to form sacrificial structures that are separated from a desired structure during a release process via the sacrificial structures being only attached to sacrificial material or potentially by dissolution of the sacrificial structures themselves using a process that is insufficient to reach structural material that is intended to form part of a desired structure. It should be understood that in some embodiments, small amounts of structural material may be removed, after or during release of sacrificial material. Such small amounts of structural material may have been inadvertently formed due to imperfections in the fabrication process or may result from the proper application of the process but may result in features that are less than optimal (e.g. layers with stairs steps in regions where smooth sloped surfaces are desired. In such cases the volume of structural material removed is typically minuscule compared to the amount that is retained and thus such removal is ignored when labeling materials as sacrificial or structural. Sacrificial materials are typically removed by a dissolution process, or the like, that destroys the geometric configuration of the sacrificial material as it existed on the build layers. In many embodiments, the sacrificial material is a conductive material such as a metal. As will be discussed hereafter, masking materials though typically sacrificial in nature are not termed sacrificial materials herein unless they meet the required definition of sacrificial material.

"Supplemental sacrificial material" as used herein refers to a material that does not form part of the structure when the structure is put to use and is not added as part of the build layers but instead is added to a plurality of layers simultaneously (e.g. via one or more coating operations that applies the material, selectively or in a blanket fashion, to a one or more surfaces of a desired build structure that has been released from an initial sacrificial material. This supplemental sacrificial material will remain in place for a period of time and/or during the performance of certain post layer formation operations, e.g. to protect the structure that was released from a primary sacrificial material, but will be removed prior to putting the structure to use.

"Primary sacrificial material" as used herein is a sacrificial material that is located on a given build layer and which is typically deposited or applied during the formation of that build layer and which makes up more than 20% of the sacrificial material volume of the given build layer. In some embodiments, the primary sacrificial material may be the same on each of a plurality of build layers or may be different on different build layers. In some embodiments, a given primary sacrificial material may be formed from two or more materials by the alloying or diffusion of two or more materials to form a single material.

"Secondary sacrificial material" as used herein is a sacrificial material that is located on a given build layer and is typically deposited or applied during the formation of the build layer but is not a primary sacrificial materials as it individually accounts for only a small volume of the sacrificial material associated with the given layer. A secondary sacrificial material will account for less than 20% of the volume of the sacrificial material associated with the given layer. In some preferred embodiments, each secondary sacrificial material may account for less than 10%, 5%, or even 2% of the volume of the sacrificial material associated with the given layer. Examples of secondary structural materials may include seed layer materials, adhesion layer materials, barrier layer materials (e.g. diffusion barrier material), and the like. These secondary sacrificial materials are typically applied to form coatings having thicknesses less than 2 microns, 1 micron, 0.5 microns, or even 0.2 microns). The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No. 7,195,989. These referenced applications are incorporated herein by reference as if set forth in full herein.

"Adhesion layer", "seed layer", "barrier layer", and the like refer to coatings of material that are thin in comparison to the layer thickness and thus generally form secondary structural material portions or sacrificial material portions of some layers. Such coatings may be applied uniformly over a previously formed build layer, they may be applied over a portion of a previously formed build layer and over patterned structural or sacrificial material existing on a current (i.e. partially formed) build layer so that a non-planar seed layer results, or they may be selectively applied to only certain locations on a previously formed build layer. In the event such coatings are non-selectively applied, selected portions may be removed (1) prior to depositing either a sacrificial material or structural material as part of a current layer or (2) prior to beginning formation of the next layer or they may remain in place through the layer build up process and then etched away after formation of a plurality of build layers.

"Masking material" is a material that may be used as a tool in the process of forming a build layer but does not form part of that build layer. Masking material is typically a photopolymer or photoresist material or other material that may be readily patterned. Masking material is typically a dielectric. Masking material, though typically sacrificial in nature, is not a sacrificial material as the term is used herein. Masking material is typically applied to a surface during the formation of a build layer for the purpose of allowing selective deposition, etching, or other treatment and is removed either during the process of forming that build layer or immediately after the formation of that build layer.

"Multilayer structures" are structures formed from multiple build layers of deposited or applied materials.

"Multilayer three-dimensional (or 3D or 3-D) structures" are Multilayer Structures that meet at least one of two criteria: (1) the structural material portion of at least two layers of which one has structural material portions that do not overlap structural material portions of the other.

"Complex multilayer three-dimensional (or 3D or 3-D) structures" are multilayer three-dimensional structures formed from at least three layers where a line may be defined that hypothetically extends vertically through at least some portion of the build layers of the structure will extend from structural material through sacrificial material and back through structural material or will extend from sacrificial material through structural material and back through sacrificial material (these might be termed vertically complex multilayer three-dimensional structures). Alternatively, complex multilayer three-dimensional structures may be defined as multilayer three-dimensional structures formed from at least two layers where a line may be defined that hypothetically extends horizontally through at least some portion of a build layer of the structure that will extend from structural material through sacrificial material and back through structural material or will extend from sacrificial material through structural material and back through sacrificial material (these might be termed horizontally complex multilayer three-dimensional structures). Worded another way, in complex multilayer three-dimensional structures, a vertically or horizontally extending hypothetical line will extend from one or structural material or void (when the sacrificial material is removed) to the other of void or structural material and then back to structural material or void as the line is traversed along at least a portion of the line.

"Moderately complex multilayer three-dimensional (or 3D or 3-D) structures are complex multilayer 3D structures for which the alternating of void and structure or structure and void not only exists along one of a vertically or horizontally extending line but along lines extending both vertically and horizontally.

"Highly complex multilayer (or 3D or 3-D) structures are complex multilayer 3D structures for which the structure-to-void-to-structure or void-to-structure-to-void alternating occurs once along the line but occurs a plurality of times along a definable horizontally or vertically extending line.

"Up-facing feature" is an element dictated by the cross-sectional data for a given build layer "n" and a next build layer "n+1" that is to be formed from a given material that exists on the build layer "n" but does not exist on the immediately succeeding build layer "n+1". For convenience the term "up-facing feature" will apply to such features regardless of the build orientation.

"Down-facing feature" is an element dictated by the cross-sectional data for a given build layer "n" and a preceding build layer "n−1" that is to be formed from a given material that exists on build layer "n" but does not exist on the immediately preceding build layer "n−1". As with up-facing features, the term "down-facing feature" shall apply to such features regardless of the actual build orientation.

"Continuing region" is the portion of a given build layer "n" that is dictated by the cross-sectional data for the given build layer "n", a next build layer "n+1" and a preceding build layer "n−1" that is neither up-facing nor down-facing for the build layer "n".

"Minimum feature size" refers to a necessary or desirable spacing between structural material elements on a given layer that are to remain distinct in the final device configuration. If the minimum feature size is not maintained on a given layer, the fabrication process may result in structural material inadvertently bridging the two structural elements due to masking material failure or failure to appropriately fill voids with sacrificial material during formation of the given layer such that during formation of a subsequent layer structural material inadvertently fills the void. More care during fabrication can lead to a reduction in minimum feature size or a willingness to accept greater losses in productivity can result in a decrease in the minimum feature size. However, during fabrication for a given set of process parameters, inspection diligence, and yield (successful level of production) a minimum design feature size is set in one way or another. The above described minimum feature size may more appropriately be termed minimum feature size of sacrificial material regions. Conversely a minimum feature size for structure material regions (minimum width or length of structural material elements) may be specified. Depending on the fabrication method and order of deposition of structural material and sacrificial material, the two types of minimum feature sizes may be different. In practice, for example, using electrochemical fabrication methods and described herein, the minimum features size on a given layer may be roughly set to a value that approximates the layer thickness used to form the layer and it may be considered the same for both structural and sacrificial material widths and lengths. In some more rigorously implemented processes, examination regiments, and rework requirements, it may be set to an amount that is 80%, 50%, or even 30% of the layer thickness. Other values or methods of setting minimum feature sizes may be set.

"Sublayer" as used herein refers to a portion of a build layer that typically includes the full lateral extents of that build layer but only a portion of its height. A sublayer is usually a vertical portion of build layer that undergoes independent processing compared to another sublayer of that build layer.

Escapement Mechanisms and Safing and Arming Applications

Linear escapement devices of the present invention may be formed using the electrochemical fabrication methods set forth herein or via some other layer formation and stacking method using low layer counts (based on the required number of layers to provide the necessary features and gaps between features of the mechanisms). These devices may also be formed to have small XY footprints (i.e. assuming the layer stacking direction is the Z direction which corresponds to the carrier or munition launch axes). The escapement mechanisms described herein may incorporate additional features that may be useful for munition or other explosive safing and arming applications. Such additional features may be purely of a mechanical nature or of an electromechanical nature.

FIGS. 5A and 5B provide back (FIG. 5A) and front (FIG. 5B) views of an escapement mechanism 100 including a mass cell and an arming cell according to a first embodiment of the invention wherein the mechanism is actuated by a substantially simultaneous linear acceleration, in direction 111, and rotation, in direction 112, about a central point 110 which causes release of both an out of plane retention latch 123 and a rotational retention latch 133 wherein the forces for driving the movement of the escapement arise from a launch acceleration of a carrier or munition and a rotation of the carrier or munition as it is launched. Devices of the first and second embodiments result in arming of the device (i.e. positioning an arming cell into a location for triggering an explosion) only after a time delay which follows the mechanism experiencing a rotational force and an out of plane force that is large enough to disengage both the rotational and linear locking mechanisms.

The out of plane lock 120 will move out of the way of the gear arm 153 when the device experiences a force, or inertial delay, in the out of plane direction (e.g. in the Z direction assuming layers are formed in the XY plane). The rotational lock 130 will disengage the slider 104 when the device experiences a rotational force (centripetal acceleration). In other embodiments in-plane locks may also be used as appropriate. Once both the out of plane lock 120 and rotational lock 130 are disengaged, the slider 104 is free to move in the direction dictated by the centripetal acceleration. The rocking verge 141 and starwheel 142 provide a time delay. When the slider has moved to it's maximum position, the explosive igniter cavity 102 is in position for arming. Note that the cup for the explosive can be fabricated facing either direction.

In alternative embodiments, additional forces may be required to transition from a safe to an armed state. Such additional forces may exist in parallel in time or in series. In some embodiments, arming may be initiated after a single force instead of a pair of forces while in other embodiments other actuation mechanisms may be used to trigger the transition from safe to armed states. In some embodiments the transition may be formed by purely mechanical action while in other embodiments electromechanical mechanisms or thermal mechanism may be involved. Such other mechanisms may include for example temperature variations (e.g. triggering movement of a bimetal strip element), radiation variations (e.g. heat coming from propulsion systems or launching systems). Other mechanisms may include re-safing mechanisms if two or more criteria are not met within a required period of time. Mechanisms of these variations may be used independently of the linear and/or rotational acceleration triggers of the first and second embodiments or may be used in addition to one or both of these trigger events.

In other alternative embodiments, multi-trigger or single trigger escapement mechanisms may be used for other purposes that involve triggering or allowing initiation of primary events after an initial trigger and/or time delay event. Such other purposes may include launching lockout and allowance events for explosive or non-explosive projectiles, disablement events for explosives after a prolonged time lapse or unexpected physical trauma or disturbance that may result in unsafe launching or activation of the device, as signal indicators for any device that may have experienced a physically traumatic event that could make continued use of the device unsafe (e.g. safety devices such as motorcycle, bicycle, skateboarding, or skiing helmets that have undergone a collision or dropping event, munitions that may have become unsafe for launching as a result of mishandling or traumatic events).

Figure 6A:
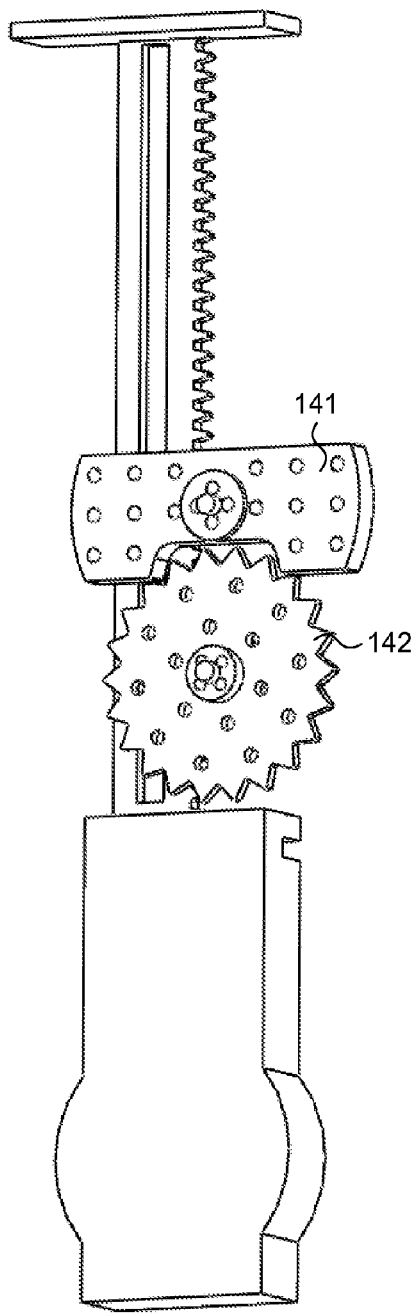
FIGS. 6A and 6B provide back and front views of the mechanism of the first embodiment with the escapement frame removed.
Figure 6B:
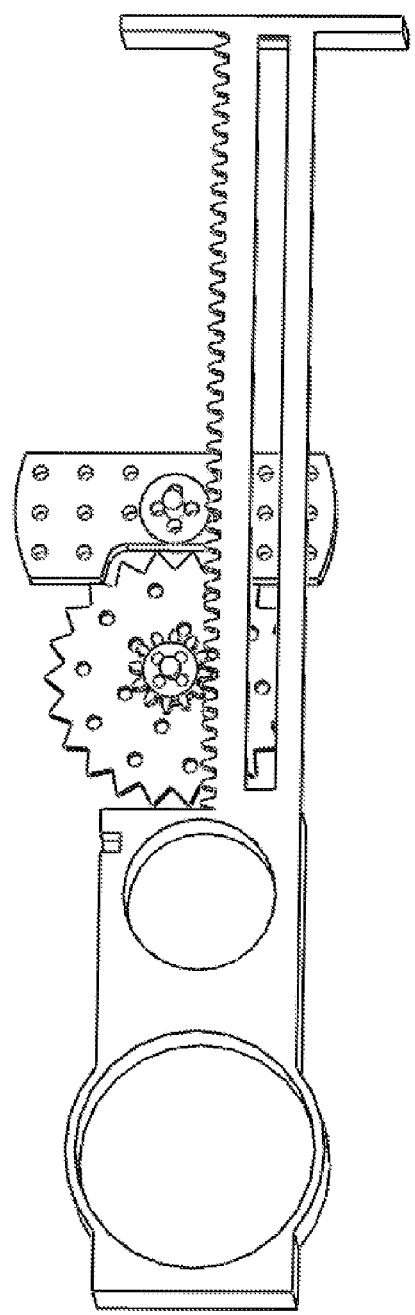

FIGS. 6A and 6B provide back (FIG. 6A) and front (FIG. 6B) views of the mechanism of the first embodiment with the escapement frame 105 removed.

Figures 7, 8:
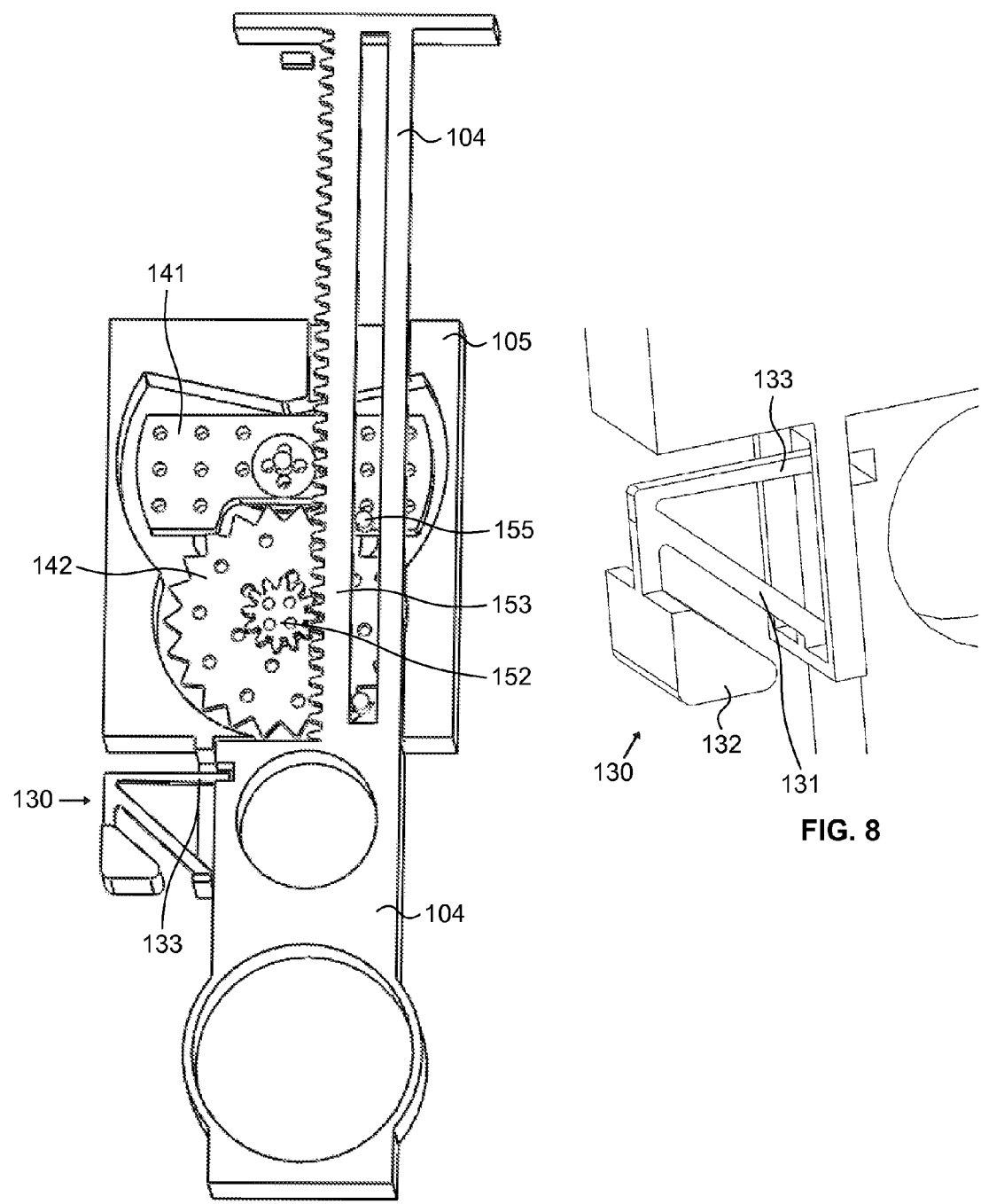
FIG. 7 provides a cross-section view (sectioned along a plane corresponding to the plane of the layers that may have been used in forming the device) so that the escapement arm (verge) engagement gear (starwheel) and rack and pinion drive gears, and the verge motion limiting protrusion can be seen wherein the center of rotation of the device corresponds to the center of pivoting of the verge.
FIG. 8 provides a close up view of the rotational lock including the mounting or flexure or arm, the inertial mass and the engagement latch.

FIG. 7 provides a cross-sectional view (sectioned along a plane corresponding to the plane of the layers that may have been used in forming the device) from the back such that the escapement arm (verge) 141, engagement gear (starwheel) 142, and rack 153 and pinon 152 drive gears, and the verge motion limiting protrusion 155 can be seen wherein the center of rotation of the device 110 corresponds to the center of pivoting of the verge.

FIG. 8 provides a close up view of the rotational lock 230 including the mounting or flexure or arm 131, the inertial mass 132 and the engagement latch 133.

FIGS. 9A and 9B provide close up side and back views of the out of plane lock including the mounting flexure or arm 121, the inertial mass 122, and the engagement latch 123 wherein during operation (i.e. in response to accelerations that lead to the disengagement of both latches) the gear rack moves downward (in FIG. 9A) such that the engagement latch slides above the upper (or distal) end of the gear rack (in FIG. 9A) thus allowing the gear rack to move relative to the escapement frame 105 under the timing dictated by the movement of the escapement arm.

Figure 10:
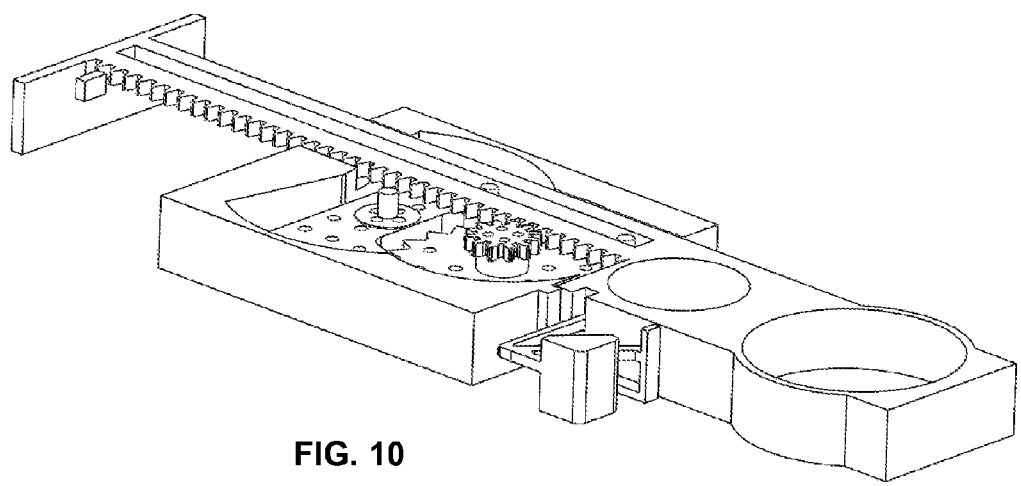
FIGS. 10 and 11 provide additional sectioned views of the mechanism of the first embodiment as in FIG. 7 but from different perspectives.
Figure 11:
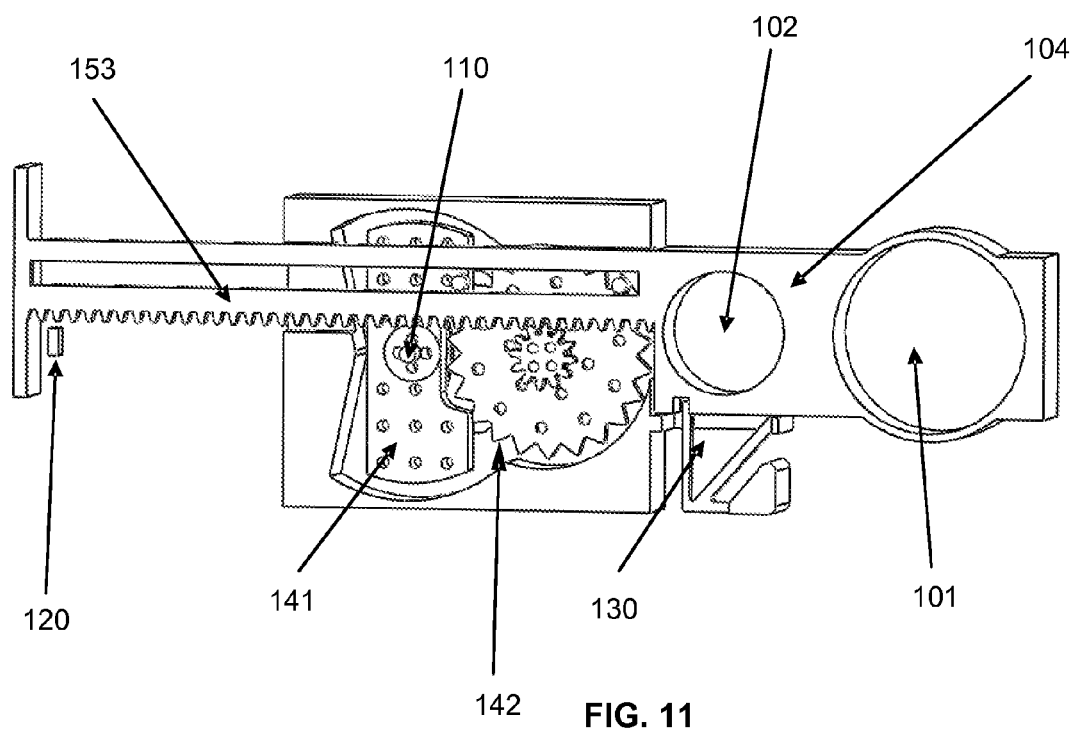

FIGS. 10 and 11 provide additional sectioned views of the mechanism of the first embodiment as in FIG. 7 but from different perspectives.

Figure 12A:
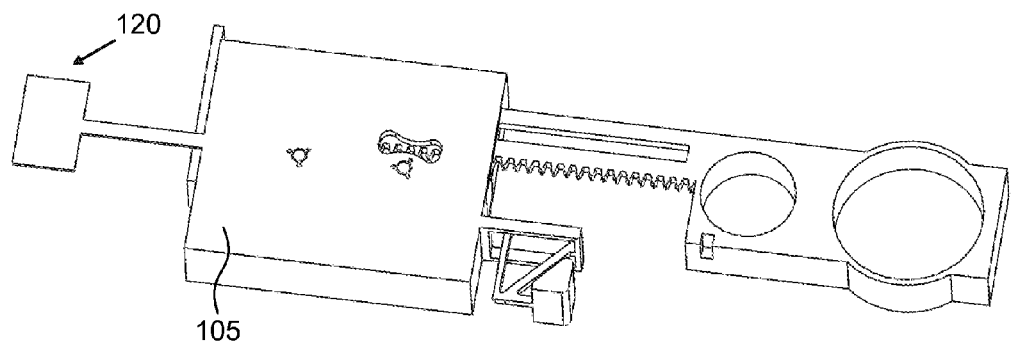
FIGS. 12A and 12B provide back and sectioned views of the mechanism of the first embodiment after full deployment of the rack and associated arming cell and mass cell have moved relative to the frame wherein during operation the frame may be held in a fixed position relative to a munition or other carrier on which the mechanism rides and provides with a timed functionality.
Figure 12B:
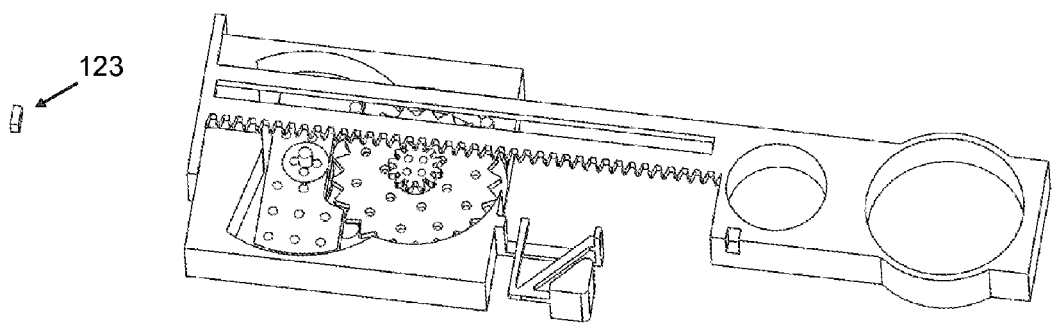

FIGS. 12A and 12B provide back (FIG. 12A) and sectioned (FIG. 12B) views of the mechanism of the first embodiment after full deployment of the rack 153 and associated arming cell 102 and mass cell 101 have moved relative to the frame wherein during operation the frame 105 may be held in a fixed position relative to a munition or other carrier on which the mechanism rides and is provided with a timed functionality by the mechanism of this embodiment.

Figure 13A:
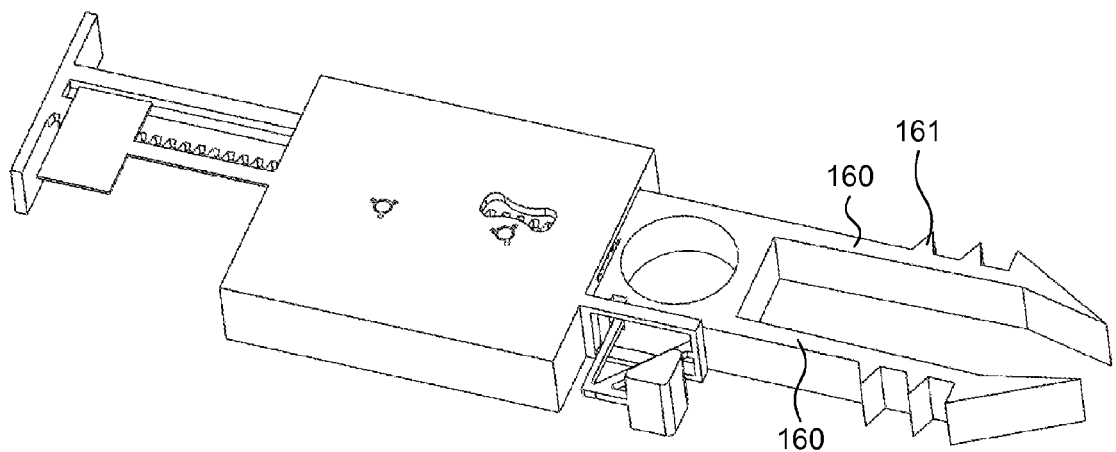
FIGS. 13A and 13B provide perspective views of an alternative to the first embodiment where the mass cell is replaced by retention arms that can be made to hold a separately fabricated mass such a tube, pipe or other cylindrical structure with notches capable of being engaged by the protrusions on the outer surface of the retention arms.
Figure 13B:
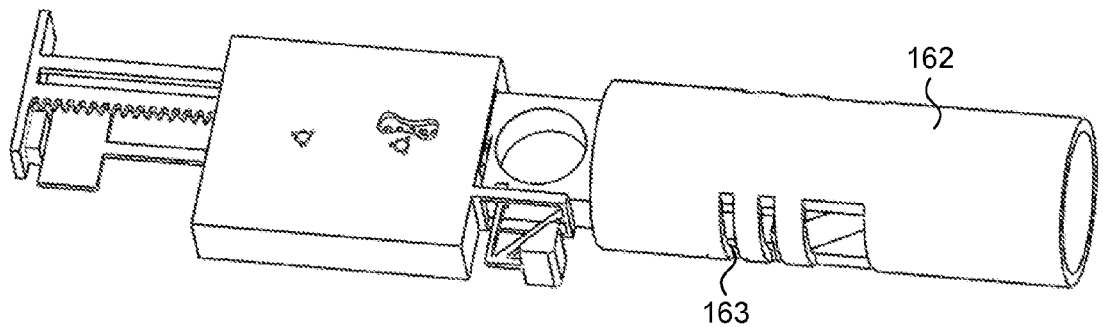
Figure 14A:
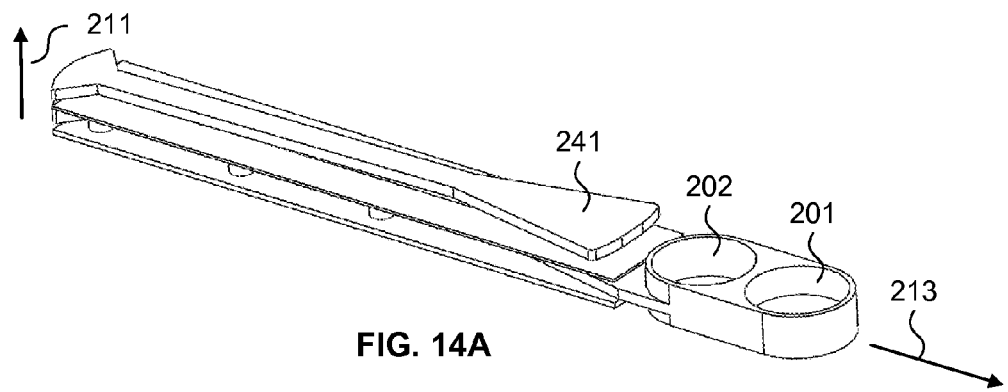
FIGS. 14A-14D provides a perspective view of an escapement mechanism including a mass cell and an arming cell according to a second embodiment of the invention wherein the mechanism is actuated by a substantially simultaneous linear acceleration and rotation (about an axis which extends in the direction of acceleration and is located at a desired position along the shaft between the initial pendulum pivot point and initial center of the mass cell) which causes release of both an out of plane retention latch and a rotational retention latch and which in turn allows the linear movement of the shaft (including the mass cell and the arming or explosive cell) relative to a frame via oscillation of a pendulum about a pivot point having a fixed position relative to the shaft as it engages and disengages a plurality of stops fixed to the frame wherein the forces for driving the movement of the escapement arise from a launch acceleration of a carrier or munition and a rotation of the carrier or munition as it is launched.
Figure 14B:
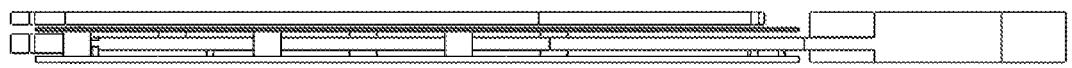
Figure 14C:
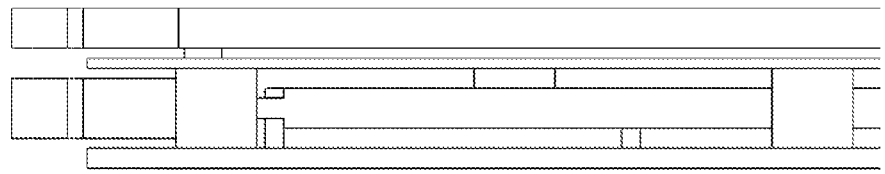
Figure 14D:
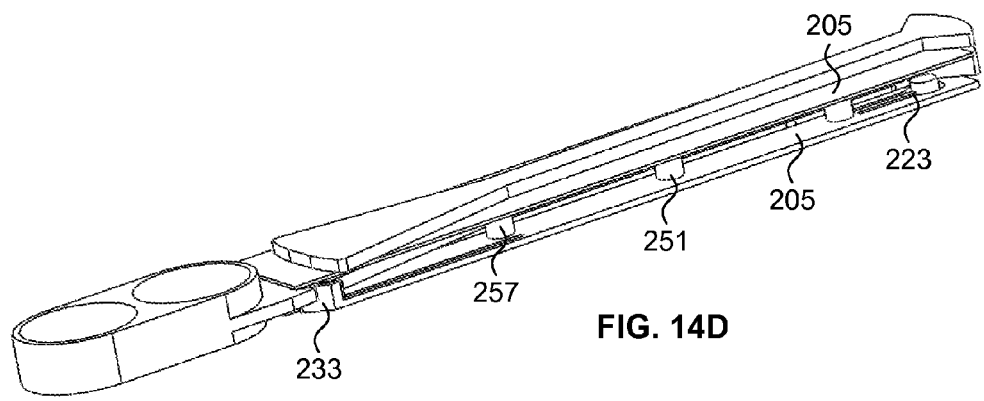

FIGS. 13A and 13B provide perspective views of an alternative to the first embodiment where the mass cell 101 (which was capable of receiving a mass of a desired configuration or being formed with a mass therein) is replaced by retention arms 160 that can be made to hold a separately fabricated mass 162 such as a tube, pipe or other cylindrical structure with notches 163 capable of being engaged by the protrusions 161 on the outer surface of the retention arms 160. Of course in variations of this alternative the retention arms and mass may take on different configurations, e.g. more or fewer protrusions may be used, the mass may be solid with only selected cutouts protrusions may be configured to allow relatively easy mounting of the mass onto the arms but relatively difficult separation.

Numerous other variations of the first embodiment are also possible. For example, timing delays can be optimized by changing the length of the gear arm or the number of teeth on the rack per unit length or the number of teeth on the starwheel, the mass, or the like. To initiate a primary explosion, an initiating explosive (e.g. primer) may be placed in the explosive igniter cavity. In alternative embodiments, the size of the cavity can be optimized for the application. In alternative embodiments, the lengths, thicknesses, configurations of the flexure arms may be changed to provide appropriate triggering only when force levels are appropriately high. Orientations of locks may be changed so that triggering occurs only when the forces originate from the right directions. In some alternative embodiments, dampers or other limiting devices may be used to inhibit triggering from inappropriately directed forces. In still other embodiments, mechanisms may be added so that arming time varies such that a minimum arming distance is necessary regardless of projectile launching speed. In other embodiments, gear spacing may be varied, verge weight or length may be varied, the verge to starwheel interface configuration may be varied, starwheel tooth configuration or size may be varied, and the like. The mass cell may be filled with any appropriate material to provide a desired mass for the anticipated force, e.g. solder (reflowed), epoxy, structural material deposited during layer formation, or the like. In some embodiments, the escapement can be made much larger to increase it's momentum to further delay it's clocking function. As shown in FIG. 13B, in some alternative embodiments the mass cavity may be replaced by a tube or other attachable mass that can be used as a weight which may be hollow or filled. Such a tube may be crimped to retention arms or may be engaged with the arms by complementary features (e.g. feature that allow easy assembly but more difficult in disassembly.

FIGS. 14A-14D provides a perspective view (FIG. 14A), a side view (FIG. 14B), a close up side view (FIG. 14C), and a second perspective view (FIG. 14D) with a different orientation of an escapement mechanism 200 including a mass cell 201 and an arming cell 202 on a shaft 204 according to a second embodiment of the invention wherein the mechanism is actuated by a substantially simultaneous linear acceleration in direction 211 and rotation (about an axis which extends in the direction of acceleration and is located at a desired position along the shaft that is located between an initial pendulum pivot point and initial center of the mass cell) which causes release of both an out of plane retention latch 223 and a rotational retention latch 233 and which in turn allows the linear movement of the shaft (including the mass cell and the arming or explosive cell) relative to a frame 205 in direction 213 via oscillation of a pendulum 241 about a pivot point 242 having a fixed position relative to the shaft 204 as a connected bumper 243 engages and disengages a plurality of stops 251-257 fixed to the frame 205 wherein the forces for driving the movement of the escapement arise from a launch acceleration of a carrier or munition and a rotation of the carrier or munition as it is launched.

In the present embodiment the bumper 243 and the pendulum 241 are attached and do not move with respect to each other. The bumper 243 and pendulum 241 pivot at pivot point 242 with respect to the shaft 204. The shaft 204 moves parallel to the longitudinal axis of the frame 205 due to a track guide 207 on the shaft that slides along a slot 206 in the frame while the pivot pin slides along a slot 208. In the present embodiment, the pendulum 241 is above the pegs or stop pins 251-257 and will not contact them. The bumper 243, which is on the same level as the pegs, will alternatingly hit the left and right pegs as linear movement of the shaft 204 relative to frame 205 occurs. The top right peg 223 is the out of plane latch of the out of plane lock which also includes an arm 221. The out of plane lock in this embodiment will move out of the way of the bumper when the device experiences a force in the out of plane direction. Rotational acceleration of sufficient magnitude will cause the shaft 204 to push through the rotational latch 233 on the end of arm 231 but only when the out of plane latch 223 is also disengaged. As with the first embodiment and its variations, in some alternative embodiments redundant or nearly redundant locks may be used to provide enhanced safety. In some alternative embodiments (which is true for the first embodiment as well), lock configurations may provide for full reseating of a lock in the event it is initially disengaged without the other lock being simultaneously disengaged.

In still other variations of the second embodiment, the timing delay can be optimized by changing the number of pegs. As with the first embodiment, a primer or initiating explosive may be placed in the explosive igniter cavity or arming cell and the size, configuration, and final "armed" position of the cell may be set for a desired application. Other variations of the second embodiment are possible and include numerous variations discussed above with regard to the first embodiment.

Once both the Out of plane latch 223 and Rotational latch 233 are disengaged, the shaft 204 is free to move in direction 111 as limited by the motion of pendulum 241. The pendulum will be subjected to acceleration as well in the direction of the centrifugal force and will be subject to swinging or rocking force by interaction between the tapered end of the pendulum that engages the next pin or peg. The momentum of the pendulum will cause a time delay. When the shaft has moved to it's maximum position, the explosive igniter cavity is in ignition position and the device is armed. In different embodiments the cup or arming cell can be fabricated to face in either direction.

Figure 15:
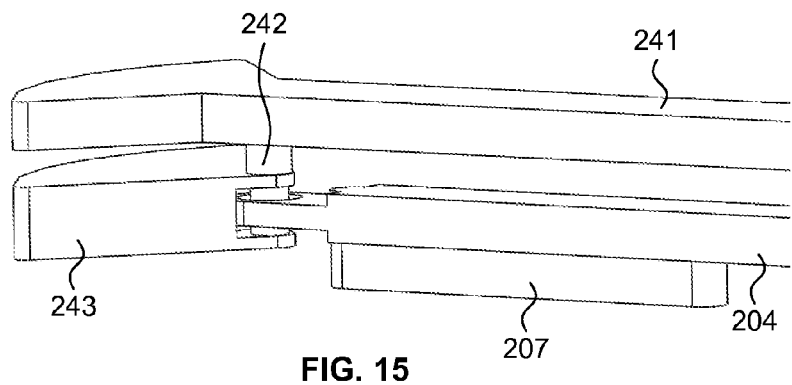
FIG. 15 provides a close up perspective view of the shaft, track guide, pendulum and pivot point of the mechanism of the second embodiment.

FIG. 15 provides a close up perspective view of the shaft 204, track guide 207, pendulum 241, and pivot point 242 of the mechanism 200 of the second embodiment.

Figure 16:
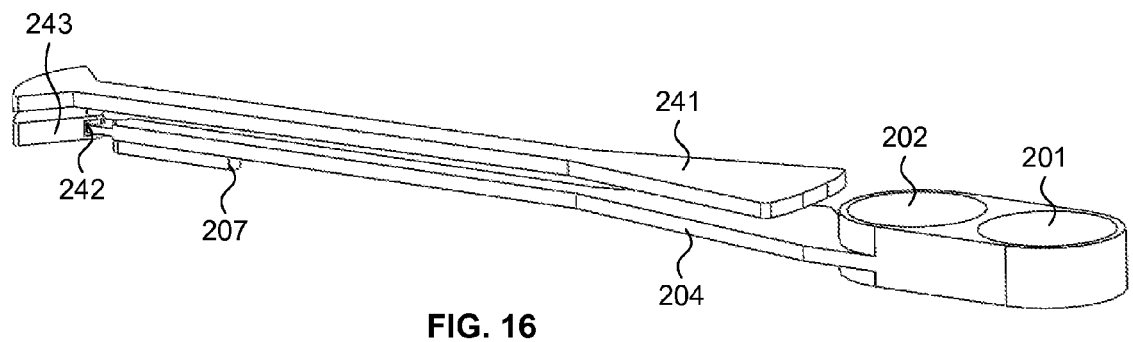
FIG. 16 provides a full view of the mechanism of the second embodiment exclusive of the frame.

FIG. 16 provides a full perspective view of the mechanism of the second embodiment exclusive of the frame.

Figure 17A:
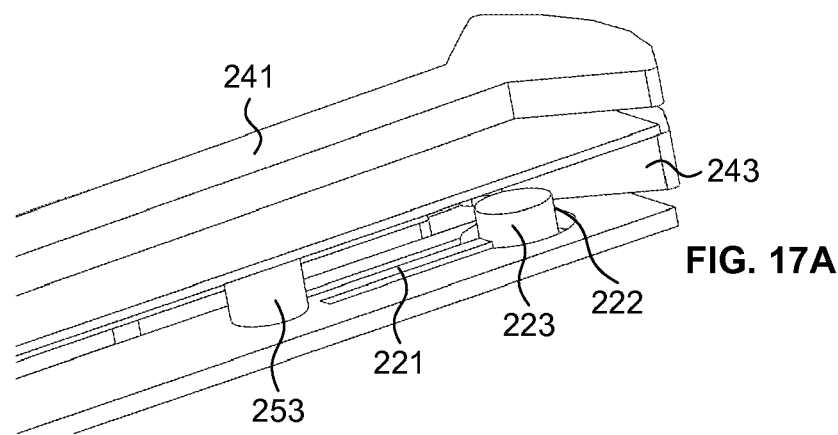
FIGS. 17A and 17B provide close up views of the out of plane lock (including the inertial mass which doubles as a stop pin and the mounting or flexure arm) of the mechanism of the second embodiment.
Figure 17B:
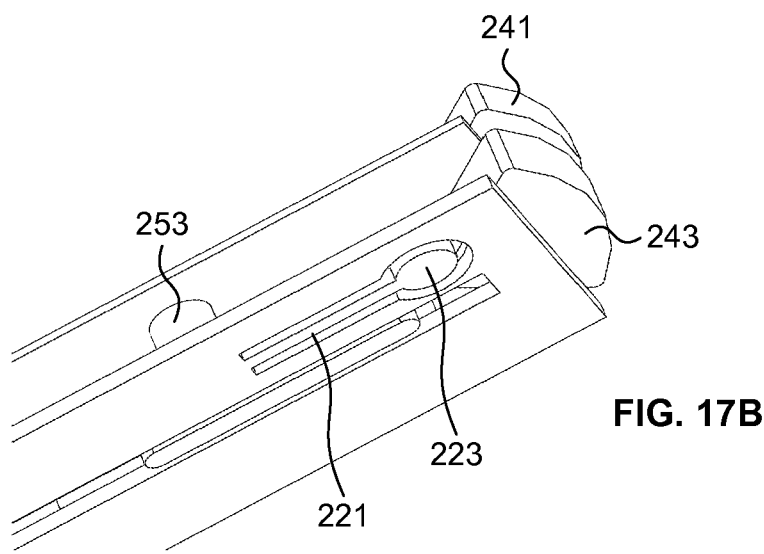

FIGS. 17A and 17B provide close up views of the out of plane lock (including the inertial mass 223 which doubles as a stop pin or latch 223 and the mounting or flexure arm 221) of the mechanism of the second embodiment.

Figure 18A:
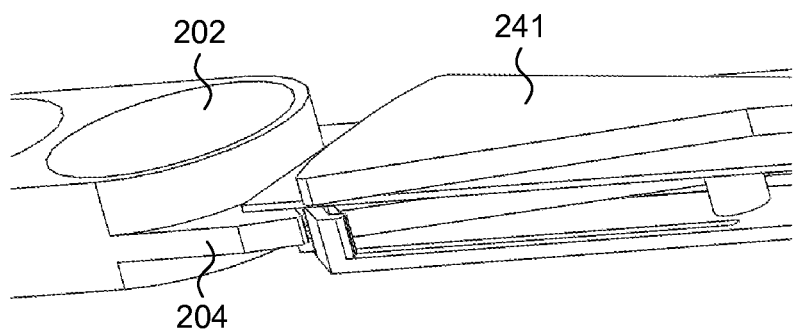
FIGS. 18A and 18B provide close up views of the rotational lock (including the inertial mass which doubles as a stop pin or catch that engages an opening or slot in the frame and the mounting or flexure arm) of the mechanism of the second embodiment.
Figure 18B:
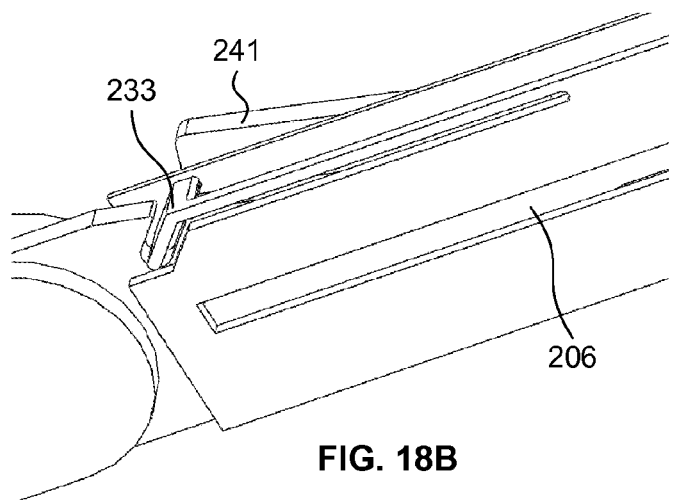

FIGS. 18A and 18B provide close up views of the rotational lock (including the inertial mass 233 which doubles as a stop pin, latch or catch 223 that engages an opening or slot in the frame and the mounting or flexure arm 231) of the mechanism of the second embodiment.

Figure 19:
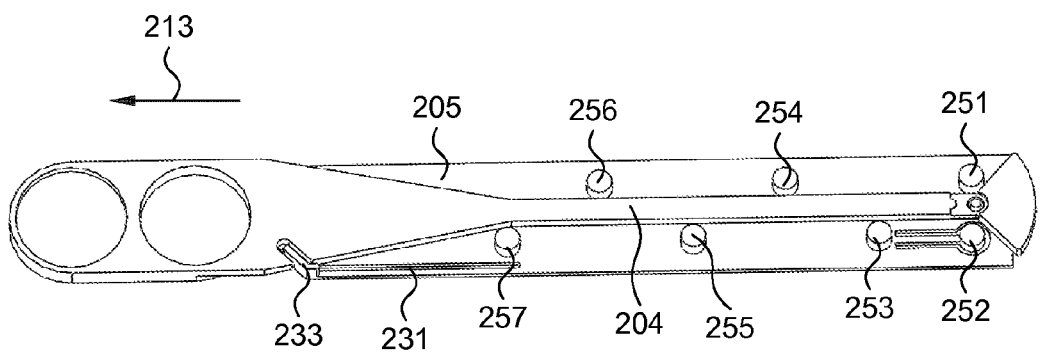
FIG. 19 provides a cross-section view of the shaft, bottom of the frame, the escapement bumper (which pivots with the pendulum (not shown)) and the plurality of bumper stops (that must be circumvented as the pendulum rocks back and forth) according to the escapement mechanism of the second embodiment wherein the arrow shows the movement of direction of the shaft relative to the frame after release of the dual latches which occurs as the pendulum rocks as a result of the force associated with the rotation of the frame about the rotational axis.

FIG. 19 provides a cross-section view of the shaft 204, bottom of the frame 205, the escapement bumper 243 (which pivots with the pendulum (not shown)) and the plurality of bumper stops 251-257 (that must be circumvented as the pendulum rocks back and forth) according to the escapement mechanism of the second embodiment wherein the arrows 213 shows the movement of direction of the shaft 204 relative to the frame 205 after release of the dual latches 223 and 233 which occurs as the pendulum rocks as a result of the force associated with the rotation of the frame about the rotational axis.

Figure 20:
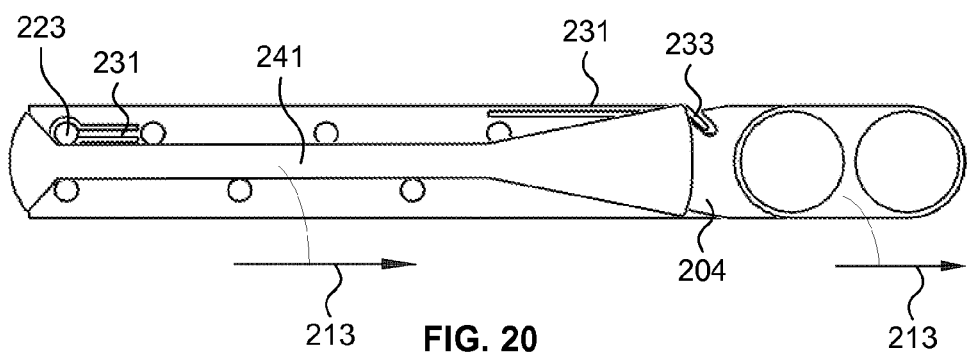
FIG. 20 provides a cross-sectional view of the portion of the mechanism of the second embodiment as shown in FIG. 19 with the addition of the pendulum in its central position overlaying the left most portion of the shaft wherein the two arrows show the directional movements of the frame and the pendulum relative to the frame which is considered to be translationally stationary relative to the munition or other carrier on which it is mounted.

FIG. 20 provides a cross-sectional view of the portion of the mechanism 200 of the second embodiment as shown in FIG. 19 with the addition of the pendulum 241 in its central position overlaying the left most portion of the shaft wherein the two arrows show the directional movements of the shaft and the pendulum relative to the frame which is considered to be translationally stationary relative to the munition or other carrier on which it is mounted.

Figure 21E:
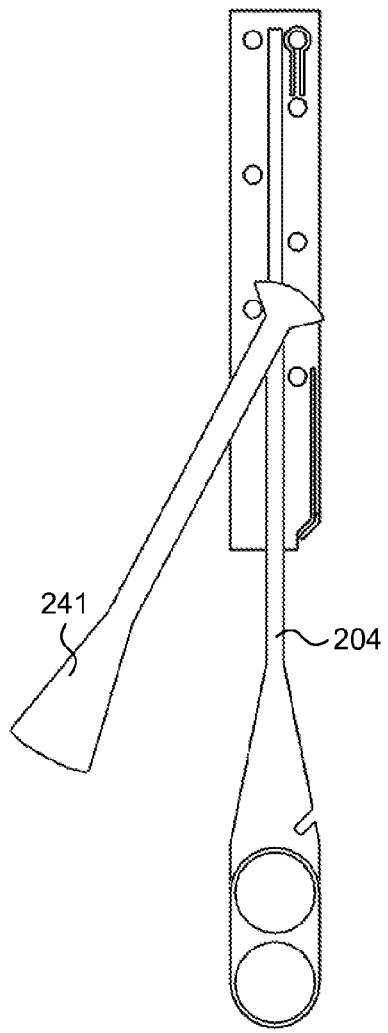
Figure 21F:
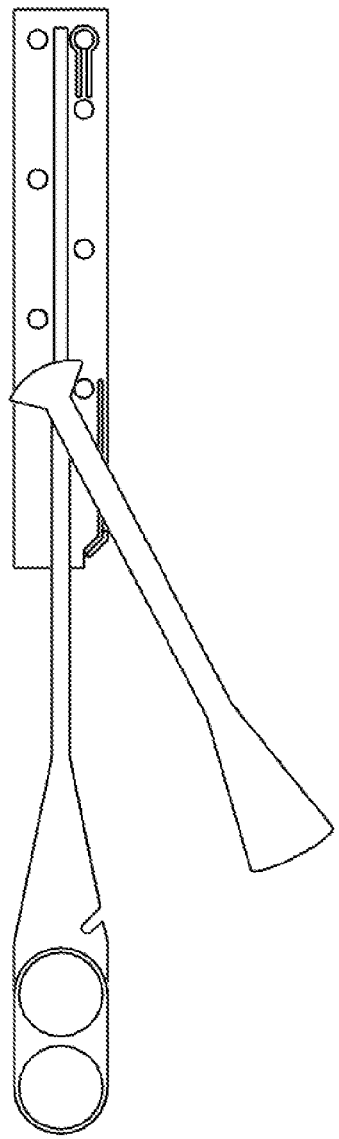
Figure 21G:
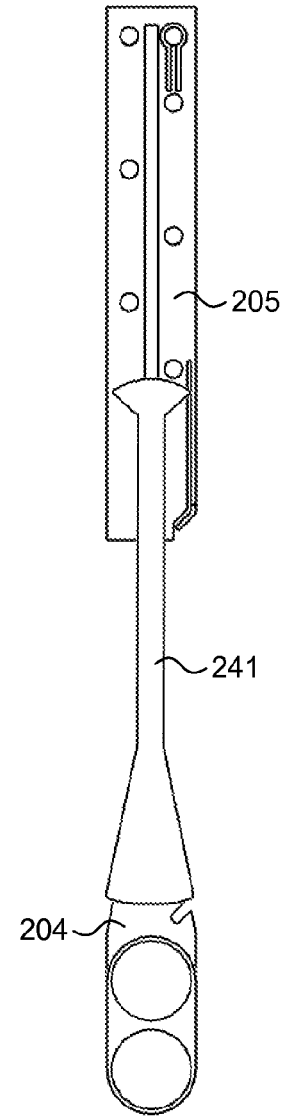
Figure 22:
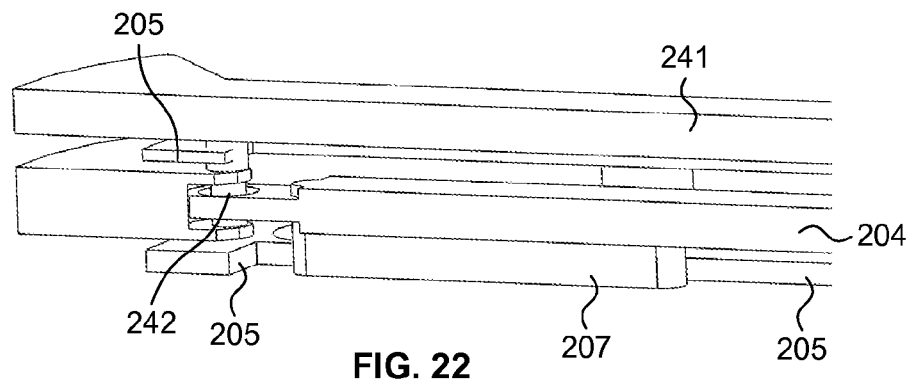

FIGS. 21A-21G provide schematic illustrations of the mechanism 200 of the second embodiment at a plurality of different states as the pendulum 241 and shaft 204 move relative to the frame 205 from an initial position (e.g. safe position) to a final position (e.g. an enabled or armed position), wherein FIG. 21A depicts the state of the process after the pendulum rocks to the left after release of the rotational lock 223 or 252, FIG. 21B depicts the state of the process after release of the linear lock and the pendulum has slipped past the first stop pin (on the left) 251, engaged the second stop pin (on the right) 253 and pivoted to the right, FIG. 21C depicts the state of the process after the pendulum engages the third pin (on the left) 254 and pivots to the left, FIG. 21D depicts the state of the process after the pendulum has engaged the forth pin (on the right) 255 and pivoted to the right, FIG. 21E depicts the state of the process after the pendulum engages the fifth pin (on the left) 256 and pivots to the left, FIG. 21F depicts the state of the process after the pendulum has engaged the sixth pin (on the right) 257 and pivoted to the right, and finally FIG. 21G shows the state of the process after the pendulum has moved past the last pin and settled in line with the shaft FIG. 22 provides a close up section view of the pivot 242 for the pendulum 241 and joined bumper 243 of the mechanism of the second embodiment.

Figure 23:
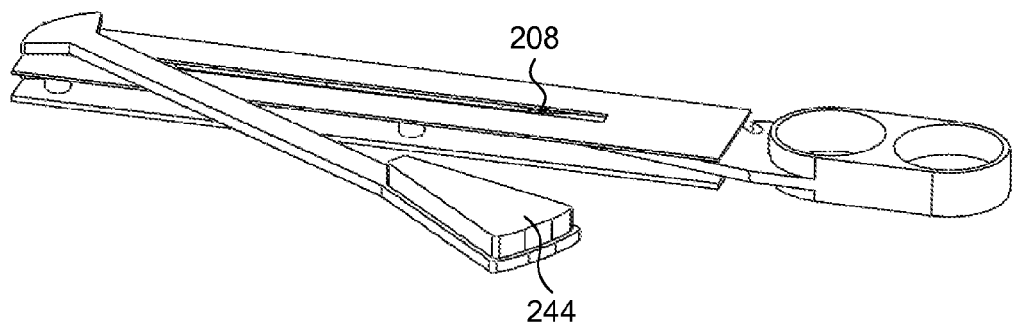
FIG. 23 provides an alternative mechanism to that of the second embodiment wherein the mechanism has an enhanced pendulum mass.

FIG. 23 provides an alternative mechanism to that of the second embodiment wherein the mechanism has an enhanced pendulum mass 244 that may be formed during a layer build up process or be formed in a separate process and then attached.

Figure 24:
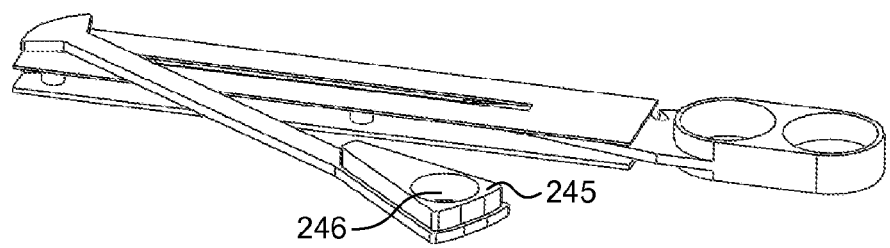
FIG. 24 provides another alternative mechanism to the second embodiment wherein the pendulum mass can be enhanced by adding a denser material to a mass located at the distal end of the pendulum.

FIG. 24 provides another alternative mechanism to the second embodiment wherein the pendulum mass 245 can be enhanced by adding a denser material in an opening 246 located at the distal end of the pendulum.

Figure 25:
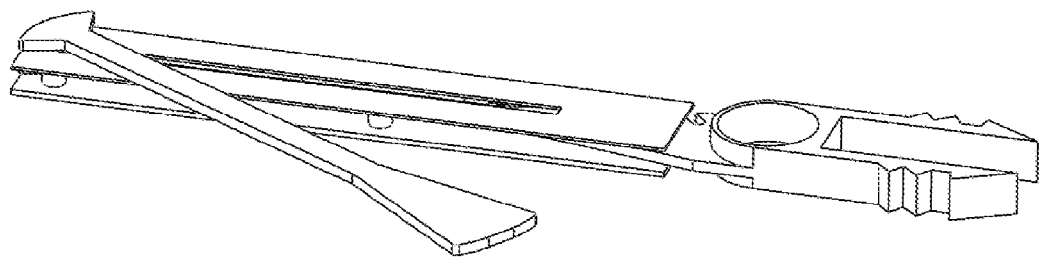
FIG. 25 provides another alternative to the mechanism of the second embodiment wherein the mass cell is replaced by retention arms that can be made to hold a separately fabricated mass such as a tube, pipe or other cylindrical structure with notches capable of being engaged by the protrusions on the outer surface of the retention arms (wherein the retained mass may be similar to that illustrated in FIG. 25.

FIG. 25 provides another alternative to the mechanism of the second embodiment wherein the mass cell is replaced with by retention arms 260 that can be made to hold a separately fabricated mass such a tube, pipe or other cylindrical structure 262 with notches 263 capable of being engaged by the protrusions 261 on the outer surface of the retention arms (wherein the retained mass may be similar to that illustrated in FIG. 13B.

Figure 26A:
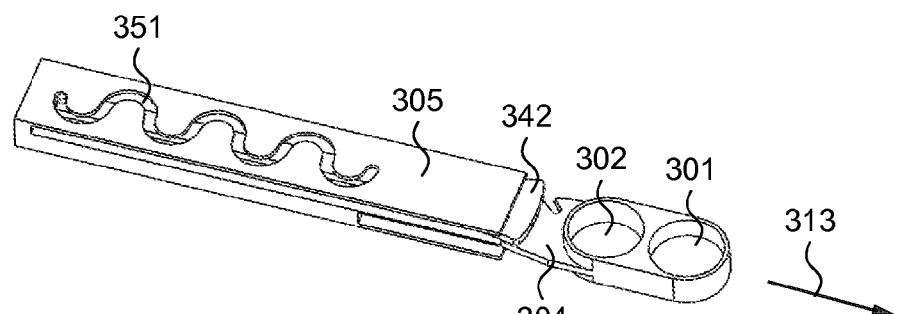
FIGS. 26A-26C provide various views of an escapement mechanism according to a third embodiment of the invention including a pendulum, shaft, pivot, mass cell, and arming cell wherein the pendulum has a pivot region including an offset guide pin (FIGS. 26B and 26C) on the pendulum that must follow a track defined within the frame of the mechanism wherein the frame provides a meandering or snake-like path (FIG. 26A) along which the pin moves as the pendulum rocks back and forth as the carrier moves forward and rotates after launching.
Figure 26B:
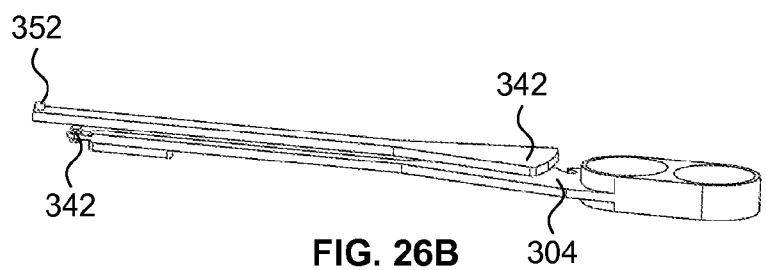
Figure 26C:
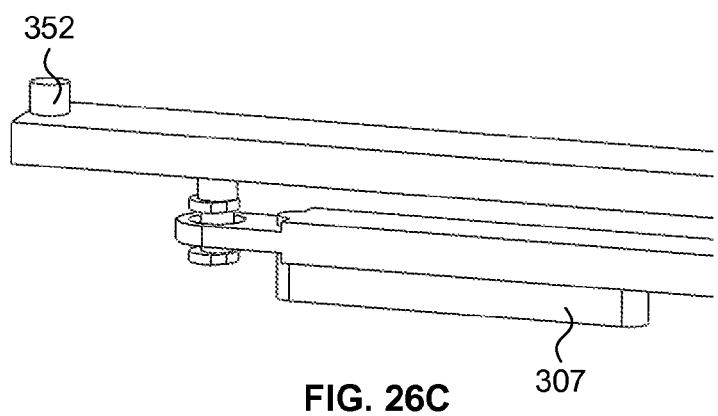

FIGS. 26A-26C provide various views of an escapement mechanism 300 according to a third embodiment of the invention wherein FIG. 26A provides a perspective view, FIG. 26B provides a perspective view with the frame removed, and FIG. 26C provides a perspective view of the pivot region of the shaft and pendulum. The mechanism includes a pendulum 343, shaft 304, pivot 342, mass cell 301, arming cell 302, a guide pin 352 on the pendulum that must follow a track 351 defined within the frame of the mechanism wherein the track 351 provides a meandering or snake-like path along which the pin moves as the pendulum rocks back and forth as the shaft moves linearly in the direction 313 which results from the rotation of the mechanism as the carrier moves forward and rotates after launching.

Figure 27A:
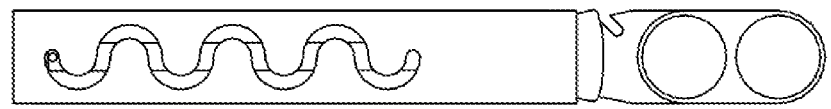
Figure 27B:
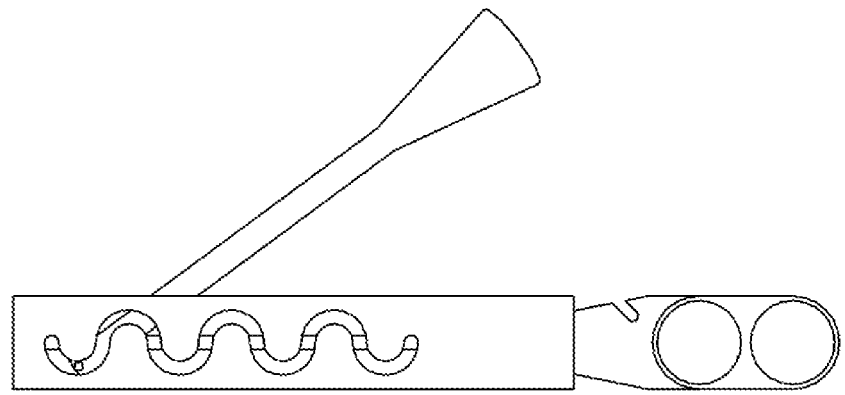
Figure 27C:
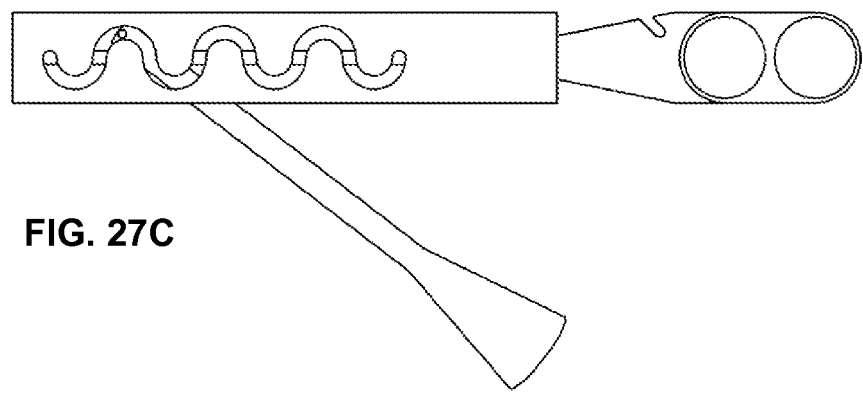
Figure 27D:
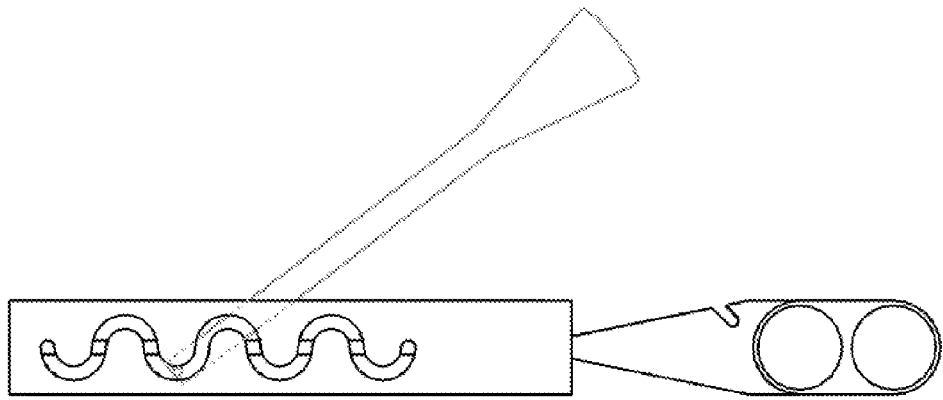
Figure 27E:
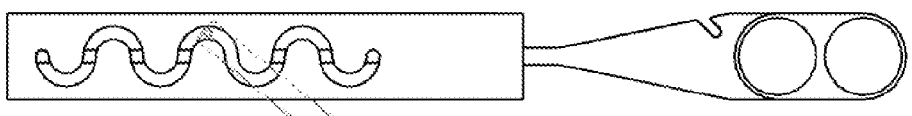
Figure 27F:

FIGS. 27A-27F depicts the shaft, pendulum, and frame of the device of the third embodiment at different states of the process of deployment as the shaft carrying the arming cell moves from a safe position to an armed position. FIG. 27A depicts the state of the process before the shaft has moved longitudinally and before the pendulum has begun its rocking. FIG. 27B depicts the state of the process after the pendulum has rocked to the right (upward in the figure) and the pin has moved along an initial left side curved path. FIG. 27C depicts the state of the process after the pendulum has rocked to the right (upward in the figure) and the pin has moved along a right side curved path. FIG. 27D depicts the state of the process after the pendulum has rocked again to the right (upward in the figure) and the pin has moved along a subsequent left side curved path. FIG. 27E depicts the state of the process after the pendulum has rocked to the left and the pin has moved along a subsequent curved path. Finally, FIG. 27F depicts the state of the process after the pendulum has rocked back and forth a sufficient number of times to cause the pin to reach the end of the meandering path and the arming cell to be placed in an engaged or armed position.

Numerous alternatives to the third embodiment are possible some of which are similar to those noted above for the first and second embodiments. To vary the time delay of the mechanism of the third embodiment, for example, the number of oscillations of the serpentine path may be varied, the length of the pendulum may be varied, or the shape of the pendulum to peg interface region may be varied.

Further Comments and Conclusions

Structural or sacrificial dielectric materials may be incorporated into embodiments of the present invention in a variety of different ways. Such materials may form a third material or higher deposited on selected layers or may form one of the first two materials deposited on some layers. Additional teachings concerning the formation of structures on dielectric substrates and/or the formation of structures that incorporate dielectric materials into the formation process and possibility into the final structures as formed are set forth in a number of patent applications filed Dec. 31, 2003. The first of these filings is U.S. Patent Application No. 60/534,184 which is entitled "Electrochemical Fabrication Methods Incorporating Dielectric Materials and/or Using Dielectric Substrates". The second of these filings is U.S. Patent Application No. 60/533,932, which is entitled "Electrochemical Fabrication Methods Using Dielectric Substrates". The third of these filings is U.S. Patent Application No. 60/534,157, which is entitled "Electrochemical Fabrication Methods Incorporating Dielectric Materials". The fourth of these filings is U.S. Patent Application No. 60/533,891, which is entitled "Methods for Electrochemically Fabricating Structures Incorporating Dielectric Sheets and/or Seed layers That Are Partially Removed Via Planarization". A fifth such filing is U.S. Patent Application No. 60/533,895, which is entitled "Electrochemical Fabrication Method for Producing Multi-layer Three-Dimensional Structures on a Porous Dielectric". Additional patent filings that provide teachings concerning incorporation of dielectrics into the EFAB process include U.S. patent application Ser. No. 11/139,262, filed May 26, 2005 by Lockard, et al., and which is entitled "Methods for Electrochemically Fabricating Structures Using Adhered Masks, Incorporating Dielectric Sheets, and/or Seed Layers that are Partially Removed Via Planarization"; and U.S. patent application Ser. No. 11/029,216, filed Jan. 3, 2005 by Cohen, et al., now abandoned, and which is entitled "Electrochemical Fabrication Methods Incorporating Dielectric Materials and/or Using Dielectric Substrates". These patent filings are each hereby incorporated herein by reference as if set forth in full herein.

Some embodiments may employ diffusion bonding or the like to enhance adhesion between successive layers of material. Various teachings concerning the use of diffusion bonding in electrochemical fabrication processes are set forth in U.S. patent application Ser. No. 10/841,384 which was filed May 7, 2004 by Cohen et al., now abandoned, which is entitled "Method of Electrochemically Fabricating Multilayer Structures Having Improved Interlayer Adhesion" and which is hereby incorporated herein by reference as if set forth in full. This application is hereby incorporated herein by reference as if set forth in full.

Some embodiments may incorporate elements taught in conjunction with other medical devices as set forth in various U.S. patent applications filed by the owner of the present application and/or may benefit from combined use with these other medical devices: Some of these alternative devices have been described in the following previously filed patent applications: (1) U.S. patent application Ser. No. 11/478,934, by Cohen et al., and entitled "Electrochemical Fabrication Processes Incorporating Non-Platable Materials and/or Metals that are Difficult to Plate On"; (2) U.S. patent application Ser. No. 11/582,049, by Cohen, and entitled "Discrete or Continuous Tissue Capture Device and Method for Making"; (3) U.S. patent application Ser. No. 11/625,807, by Cohen, and entitled "Microdevices for Tissue Approximation and Retention, Methods for Using, and Methods for Making"; (4) U.S. patent application Ser. No. 11/696,722, by Cohen, and entitled "Biopsy Devices, Methods for Using, and Methods for Making"; (5) U.S. patent application Ser. No. 11/734,273, by Cohen, and entitled "Thrombectomy Devices and Methods for Making"; (6) U.S. Patent Application No. 60/942,200, by Cohen, and entitled "Micro-Umbrella Devices for Use in Medical Applications and Methods for Making Such Devices"; and (7) U.S. patent application Ser. No. 11/444,999, by Cohen, and entitled "Microtools and Methods for Fabricating Such Tools". Each of these applications is incorporated herein by reference as if set forth in full herein.

Though the embodiments explicitly set forth herein have considered multi-material layers to be formed one after another. In some embodiments, it is possible to form structures on a layer-by-layer basis but to deviate from a strict planar layer on planar layer build up process in favor of a process that interlaces material between the layers. Such alternative build processes are disclosed in U.S. application Ser. No. 10/434,519, filed on May 7, 2003, now U.S. Pat. No. 7,252,861, entitled Methods of and Apparatus for Electrochemically Fabricating Structures Via Interlaced Layers or Via Selective Etching and Filling of Voids. The techniques disclosed in this referenced application may be combined with the techniques and alternatives set forth explicitly herein to derive additional alternative embodiments. In particular, the structural features are still defined on a planar-layer-by-planar-layer basis but material associated with some layers are formed along with material for other layers such that interlacing of deposited material occurs. Such interlacing may lead to reduced structural distortion during formation or improved interlayer adhesion. This patent application is herein incorporated by reference as if set forth in full.

The patent applications and patents set forth below are hereby incorporated by reference herein as if set forth in full. The teachings in these incorporated applications can be combined with the teachings of the instant application in many ways: For example, enhanced methods of producing structures may be derived from some combinations of teachings, enhanced structures may be obtainable, enhanced apparatus may be derived, and the like.

| U.S. Pat. App No., Filing Date U.S. App Pub No., Pub Date | Inventor, Title |
|---|---|
| 09/493,496 - Jan. 28, 2000 Pat. 6,790,377 - Sep. 14, 2004 | Cohen, "Method For Electrochemical Fabrication" |
| 10/677,556 - Oct. 1, 2003 2004-0134772 - Jul. 15, 2004 | Cohen, "Monolithic Structures Including Alignment and/or Retention Fixtures for Accepting Components" |
| 10/830,262 - Apr. 21, 2004 2004-0251142A - Dec. 16, 2004 Pat. 7,198,704 - Apr. 3, 2007 | Cohen, "Methods of Reducing Interlayer Discontinuities in Electrochemically Fabricated Three-Dimensional Structures" |
| 10/271,574 - Oct. 15, 2002 2003-0127336A - July 10, 2003 Pat. 7,288,178 - Oct. 30, 2007 | Cohen, "Methods of and Apparatus for Making High Aspect Ratio Microelectromechanical Structures" |
| 10/697,597 - Dec. 20, 2002 2004-0146650A - Jul. 29, 2004 | Lockard, "EFAB Methods and Apparatus Including Spray Metal or Powder Coating Processes" |
| 10/677,498 - Oct. 1, 2003 2004-0134788 - Jul. 15, 2004 Pat. 7,235,166 - Jun. 26, 2007 | Cohen, "Multi-cell Masks and Methods and Apparatus for Using Such Masks To Form Three-Dimensional Structures" |
| 10/724,513 - Nov. 26, 2003 2004-0147124 - Jul. 29, 2004 Pat. 7,368,044 - May 6, 2008 | Cohen, "Non-Conformable Masks and Methods and Apparatus for Forming Three-Dimensional Structures" |
| 10/607,931 - Jun. 27, 2003 2004-0140862 - Jul. 22, 2004 Pat. 7,239,219 - Jul. 3, 2007 | Brown, "Miniature RF and Microwave Components and Methods for Fabricating Such Components" |
| 10/841,100 - May 7, 2004 2005-0032362 - Feb. 10, 2005 Pat. 7,109,118 - Sep. 19, 2006 | Cohen, "Electrochemical Fabrication Methods Including Use of Surface Treatments to Reduce Overplating and/or Planarization During Formation of Multi-layer Three-Dimensional Structures" |
| 10/387,958 - Mar. 13, 2003 2003-022168A - Dec. 4, 2003 | Cohen, "Electrochemical Fabrication Method and Application for Producing Three-Dimensional Structures Having Improved Surface Finish " |
| 10/434,494 - May 7, 2003 2004-0000489A - Jan. 1, 2004 | Zhang, "Methods and Apparatus for Monitoring Deposition Quality During Conformable Contact Mask Plating Operations" |
| 10/434,289 - May 7, 2003 20040065555A - Apr. 8, 2004 | Zhang, "Conformable Contact Masking Methods and Apparatus Utilizing In Situ Cathodic Activation of a Substrate" |
| 10/434,294 - May 7, 2003 2004-0065550A - Apr. 8, 2004 | Zhang, "Electrochemical Fabrication Methods With Enhanced Post Deposition Processing" |
| 10/434,295 - May 7, 2003 2004-0004001A - Jan. 8, 2004 | Cohen, "Method of and Apparatus for Forming Three-Dimensional Structures Integral With Semiconductor Based Circuitry" |
| 10/434,315 - May 7, 2003 2003-0234179 A - Dec. 25, 2003 Pat. 7,229,542 - Jun. 12, 2007 | Bang, "Methods of and Apparatus for Molding Structures Using Sacrificial Metal Patterns" |
| 10/434,103 - May 7, 2004 2004-0020782A - Feb. 5, 2004 Pat. 7,160,429 - Jan. 9, 2007 | Cohen, "Electrochemically Fabricated Hermetically Sealed Microstructures and Methods of and Apparatus for Producing Such Structures" |
| 10/841,006 - May 7, 2004 2005-0067292 - May 31, 2005 | Thompson, "Electrochemically Fabricated Structures Having Dielectric or Active Bases and Methods of and Apparatus for Producing Such Structures" |
| 10/434,519 - May 7, 2003 2004-0007470A - Jan. 15, 2004 Pat. 7,252,861 - Aug. 7, 2007 | Smalley, "Methods of and Apparatus for Electrochemically Fabricating Structures Via Interlaced Layers or Via Selective Etching and Filling of Voids" |
| 10/724,515 - Nov. 26, 2003 2004-0182716 - Sep. 23, 2004 Pat. 7,291,254 - Nov. 6, 2007 | Cohen, "Method for Electrochemically Forming Structures Including Non-Parallel Mating of Contact Masks and Substrates" |
| 10/841,347 - May 7, 2004 2005-0072681 - Apr. 7, 2005 | Cohen, "Multi-step Release Method for Electrochemically Fabricated Structures" |
| 60/533,947 - Dec. 31, 2003 | Kumar, "Probe Arrays and Method for Making" |
| 10/841,300 - May 7, 2004 2005 0032375 - Feb. 10, 2005 | Cohen, "Methods for Electrochemically Fabricating Structures Using Adhered Masks, Incorporating Dielectric Sheets, and/or Seed layers That Are Partially Removed Via Planarization" |
| 60/534,183 - Dec. 31, 2003 | Cohen, "Method and Apparatus for Maintaining Parallelism of Layers and/or Achieving Desired Thicknesses of Layers During the Electrochemical Fabrication of Structures" |
| 11/733,195 - Apr. 9, 2007 2008-0050524 - Feb. 28, 2008 | Kumar, "Methods of Forming Three-Dimensional Structures Having Reduced Stress and/or Curvature" |
| 11/506,586 Aug. 8, 2006 2007-0039828 Feb. 22, 2007 Pat. 7,611,616 - Nov. 3, 2009 | Cohen, "Mesoscale and Microscale Device Fabrication Methods Using Split Structures and Alignment Elements" |
| 10/949,744 - Sep. 24, 2004 2005-0126916 - Jun. 16, 2005 Pat. 7,498,714 - Mar. 3, 2009 | Lockard, "Three-Dimensional Structures Having Feature Sizes Smaller Than a Minimum Feature Size and Methods for Fabricating" |

Though various portions of this specification have been provided with headers, it is not intended that the headers be used to limit the application of teachings found in one portion of the specification from applying to other portions of the specification. For example, it should be understood that alternatives acknowledged in association with one embodiment, are intended to apply to all embodiments to the extent that the features of the different embodiments make such application functional and do not otherwise contradict or remove all benefits of the adopted embodiment. Various other embodiments of the present invention exist. Some of these embodiments may be based on a combination of the teachings herein with various teachings incorporated herein by reference.

In view of the teachings herein, many further embodiments, alternatives in design and uses of the embodiments of the instant invention will be apparent to those of skill in the art. As such, it is not intended that the invention be limited to the particular illustrative embodiments, alternatives, and uses described above but instead that it be solely limited by the claims presented hereafter.

I claim:

1. A mechanical safing and arming mechanism, comprising:
   (a) a frame having a rotatable gear and star wheel,
   (b) a shaft configured to move along a substantially linear path relative to the frame and carrying an arming cell wherein the shaft comprises a plurality of teeth that engage the rotatable gear,
   (c) a rocking verge pivotably connected to the frame and configured to undergo oscillation relative to the shaft and the frame which inhibits the free rotation of the starwheel and rotatable gear to a series of discontinuous steps that have a rate dictated by an oscillation rate of the verge;
   (d) a first latch responsive to a event for releasably hindering at least a certain motion of the shaft relative to the frame;
   (e) a second latch responsive to a second event which is different from the first event for releasably hindering at least a certain motion of the shaft relative to the frame;
   wherein as a result of a trigger event comprising both the first and second events, the first and second latches are released and the mechanism moves the arming cell from a safe location to an armed location by the motion of the shaft relative to the frame wherein the timing of the movement of the shaft relative to the frame from the safe location to the armed location is controlled by the motion of the verge and the star wheel.

2. The mechanism of claim 1 wherein the mechanism is formed monolithically.

3. The mechanism of claim 1 wherein the mechanism comprises a plurality of adhered layers of deposited metal.

4. The mechanism of claim 1 wherein the longitudinal length of the mechanism is less than 10 mm, the width of the mechanism is under 5 mm, and height of the mechanism is under 1 mm.

5. The mechanism of claim 1 wherein the longitudinal length of the mechanism is less than 5 mm, the width of the mechanism is under 3 mm, and height of the mechanism is under 1 mm.

6. The mechanism of claim 1 wherein the trigger event involves a rotational event and a linear acceleration event and the first latch is responsive to the rotational event and the second latch is responsive to the linear acceleration event.

7. The mechanism of claim 6 wherein the rotational trigger and the linear acceleration event must occur substantially simultaneously for both the first and second latch to release.

8. A method of arming an explosive device, comprising:
   (a) initiating a mechanical trigger event;
   (b) mechanically releasing first and second retention latches of a safing and arming mechanism as a result of the trigger event wherein the first and second retention latches release when subjected to first and second events which are different and wherein the trigger event comprises both the first and second events;
   (c) moving a shaft carrying an arming cell linearly relative to a frame from a safe position to an armed position, after release of the first and second retention latches, to align a primer charge in the arming cell with a firing mechanism and a main explosive charge;
   wherein the movement of the shaft relative to the frame is controlled by the oscillation of a verge and the interaction of the verge with a starwheel that is rotatably mounted on the frame which in turn allows teeth of a circular gear to engage teeth of a linear gear that forms part of the other of the shaft.

* * * * *